US008289450B2

(12) United States Patent  
Masuda et al.

(10) Patent No.: US 8,289,450 B2  
(45) Date of Patent: Oct. 16, 2012

(54) VIDEO PROCESSING APPARATUS WITH CORRECTOR FOR CORRECTING AN INPUT VIDEO SIGNAL

(75) Inventors: Kozo Masuda, Yokohama (JP); Ikuya Arai, Yokohama (JP); Masaaki Miyano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/082,797

(22) Filed: Apr. 8, 2011

(65) Prior Publication Data

US 2011/0181785 A1 Jul. 28, 2011

Related U.S. Application Data

(63) Continuation of application No. 11/602,956, filed on Nov. 22, 2006, now Pat. No. 7,952,645.

(30) Foreign Application Priority Data

Nov. 24, 2005 (JP) ................................. 2005-338000

(51) Int. Cl.  
*H04N 5/57* (2006.01)  
*H04N 5/58* (2006.01)  
*H04N 5/21* (2006.01)

(52) U.S. Cl. .......................... 348/603; 348/602; 348/624

(58) Field of Classification Search .................. 348/189, 348/744, 745, 602, 603, 624, 687, 708, 558, 348/14.02, 14.07; 455/556.1

See application file for complete search history.

(56) References Cited

U.S. PATENT DOCUMENTS

| 5,298,995 A | 3/1994 | Monta |
| 5,363,143 A | 11/1994 | Duffield |
| 5,442,406 A | 8/1995 | Altmanshofer |
| 5,486,871 A | 1/1996 | Filliman |
| 5,633,952 A | 5/1997 | Outa |
| 5,734,436 A | 3/1998 | Abe |
| 5,949,903 A | 9/1999 | Outa |
| 6,330,037 B1 | 12/2001 | Nakajima |
| 6,621,927 B1 | 9/2003 | Mori et al. |

(Continued)

FOREIGN PATENT DOCUMENTS

CN 1057919 1/1992

(Continued)

OTHER PUBLICATIONS

Tuam 3.6 A 1-Chip TV Picture Booster, Stuivenwold et al, 1994 IEEE pp. 46-47, Philips Semiconductor, Nijmegen/Eindhoven, The Netherlands.

(Continued)

*Primary Examiner* — Victor Kostak  
(74) *Attorney, Agent, or Firm* — Antonelli, Terry, Stout & Kraus, LLP.

(57) ABSTRACT

A video processing apparatus includes an input unit to which a video signal containing content is input, a first detector which detects a color of light in the surroundings, a second detector which detects whether a pattern portion formed of a single color of black or white is contained in the video signal input to the input unit, a corrector which corrects the video signal input to the input unit, and a controller. The controller conducts control so that the corrector corrects the video signal input to the input unit according to the color of light detected by the first detector if the second detector detects that the pattern portion formed of the single color of black or white is contained in the video signal input to the input unit.

7 Claims, 41 Drawing Sheets

U.S. PATENT DOCUMENTS

| | | |
|---|---|---|
| 7,046,302 B2 | 5/2006 | Konuma |
| 7,079,192 B1 | 7/2006 | Wysocki et al. |
| 7,199,840 B2 | 4/2007 | Shiota |
| 7,319,468 B2 | 1/2008 | Baker |
| 7,349,031 B2 | 3/2008 | Hosomi |
| 7,667,770 B2 * | 2/2010 | Kondo et al. ............... 348/441 |
| 2002/0089611 A1 * | 7/2002 | Kim ............................ 348/745 |
| 2003/0120365 A1 | 6/2003 | Asano |
| 2004/0109091 A1 | 6/2004 | Park |
| 2004/0165064 A1 | 8/2004 | Weitbruch |
| 2004/0233229 A1 | 11/2004 | Kimura |
| 2006/0135224 A1 * | 6/2006 | Patino et al. ............... 455/575.3 |

FOREIGN PATENT DOCUMENTS

| | | |
|---|---|---|
| CN | 1463534 | 12/2003 |
| CN | 1573848 | 2/2005 |
| JP | 06-315098 | 11/1994 |
| JP | 9-224174 | 8/1997 |
| JP | 2002-132225 | 5/2002 |
| JP | 2003-348488 | 12/2003 |
| JP | 2004-096593 | 3/2004 |
| JP | 2004-336664 | 11/2004 |
| JP | 2005-026814 | 1/2005 |
| JP | 2005-159693 | 6/2005 |
| KR | 2002-0096003 | 12/2002 |
| KR | 10-2004-0048791 | 6/2004 |

OTHER PUBLICATIONS

Endoscopy Imaging Intelligent Contrast Improvement, S. Sheraizin et al, Proceedings of the 2005 IEEE Engineering in Medicine and Biology 27th Annual Conference, Shanghai, China, Sep. 1-4, 2005, pp. 6551-6554.

* cited by examiner

| YHst | 0 | 1 | 2 | 3 | 4 | 5 | 6 | ..... | 15 |
|---|---|---|---|---|---|---|---|---|---|
| CORRECTION VALUE | 0 | 20 | 40 | 60 | 40 | 20 | 0 | 0 | 0 |

FIG.23A
FIG.23B
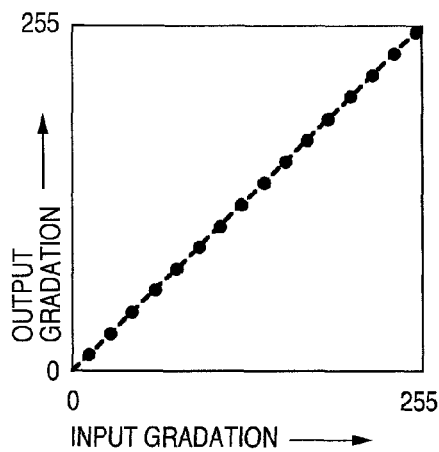
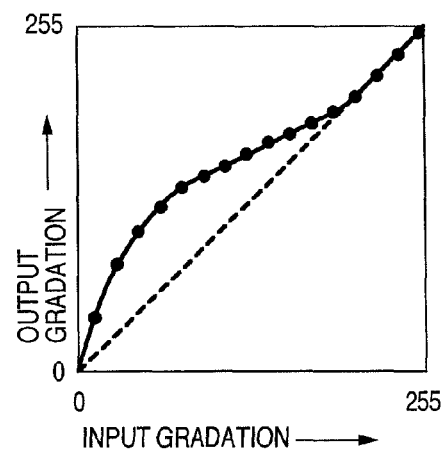
FIG.23C
FIG.23D
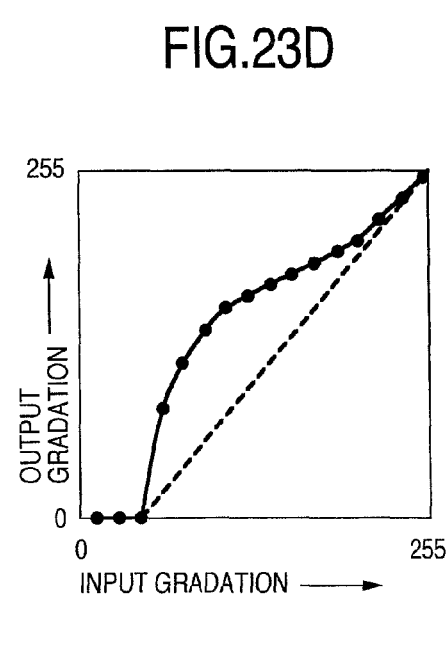

FIG.29
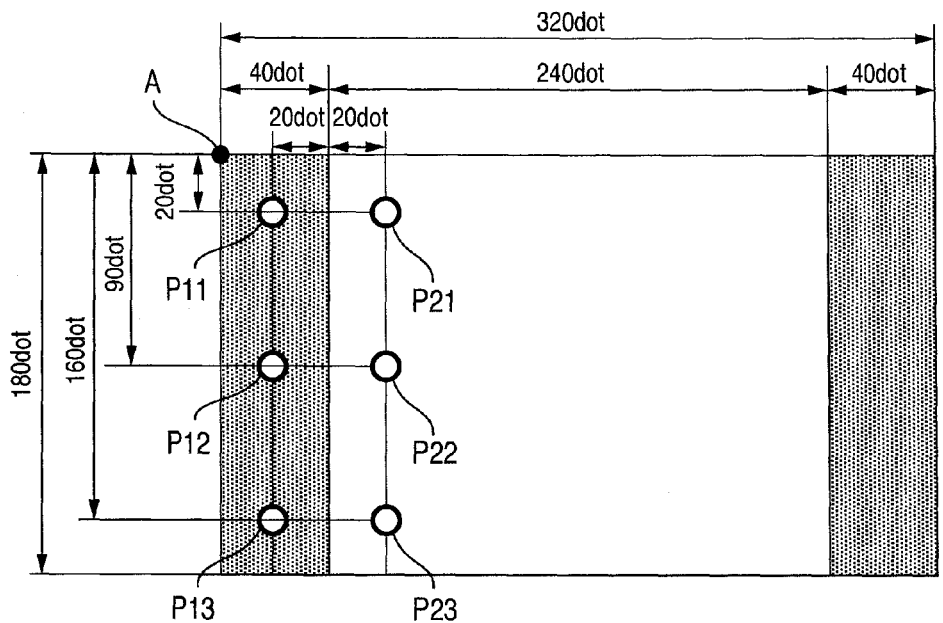
FIG.30A
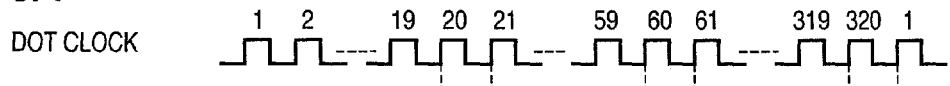
DOT CLOCK
FIG.30B
HORIZONTAL ENABLE SIGNAL
FIG.30C
HORIZONTAL PULSE
→ TIME
FIG.31A
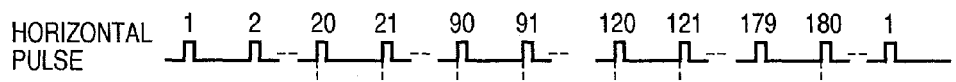
HORIZONTAL PULSE
FIG.31B
VERTICAL ENABLE SIGNAL
FIG.31C
VERTICAL PULSE
→ TIME

DOT CLOCK

HORIZONTAL
ENABLE SIGNAL

VERTICAL
ENABLE SIGNAL

AND GATE
OUTPUT SIGNAL

→ TIME

FIG.35A
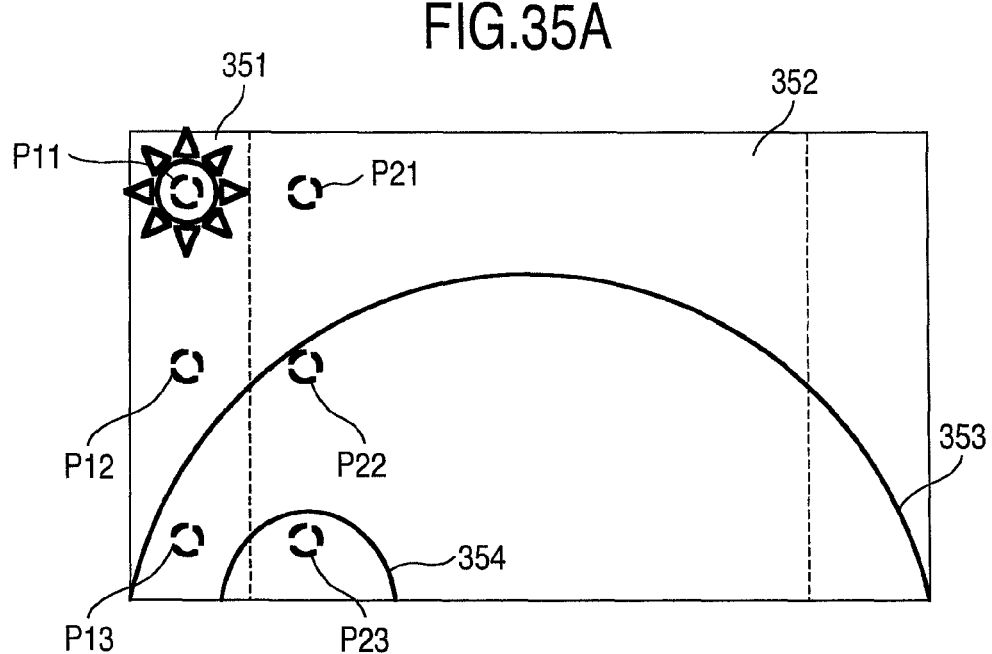
FIG.35B
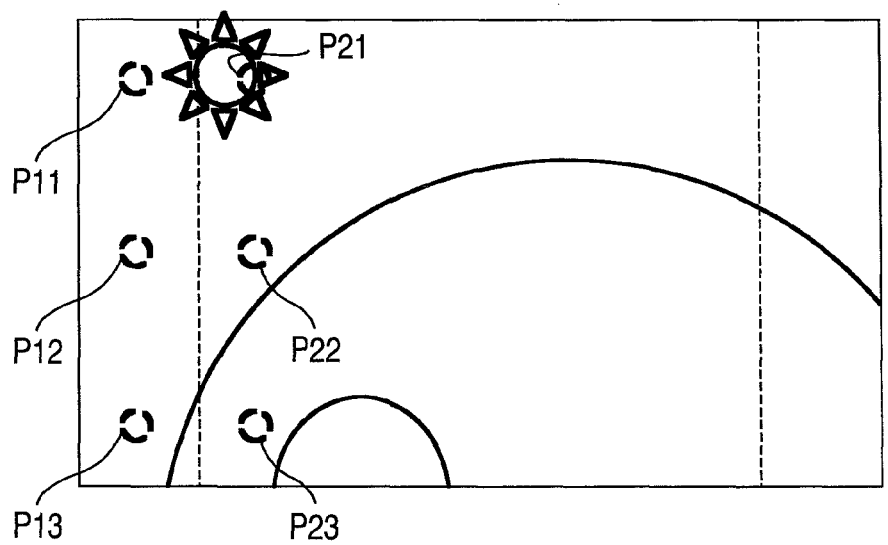
FIG.35C
| POINT | FRAME 1 | FRAME 2 | DIFFERENCE BETWEEN FRAMES |
|---|---|---|---|
| P11 | 100 | 80 | -20 |
| P12 | 80 | 80 | 0 |
| P13 | 50 | 80 | 30 |
| P21 | 80 | 100 | 20 |
| P22 | 50 | 80 | 30 |
| P23 | 40 | 50 | 10 |

FIG.36A
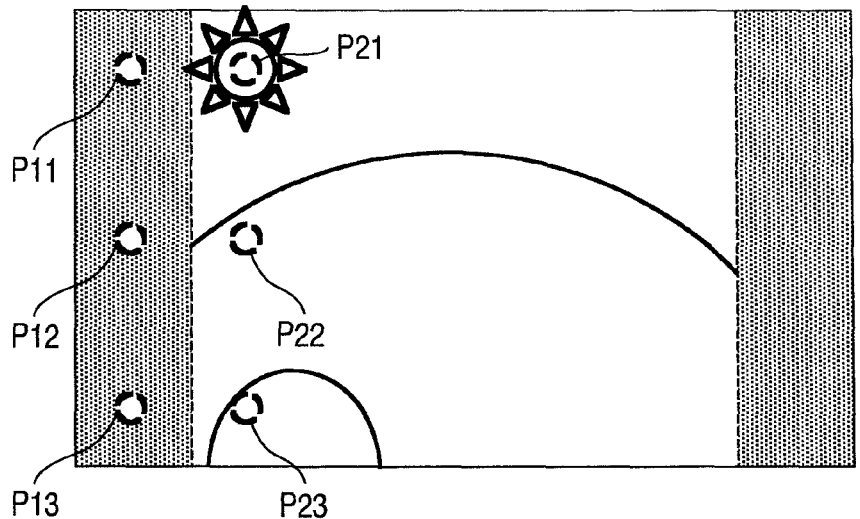
FIG.36B
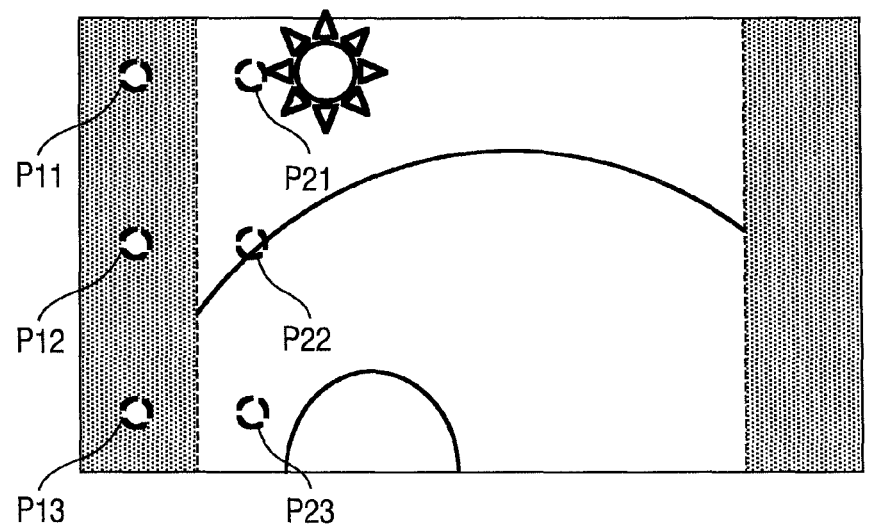
FIG.36C
| POINT | FRAME 1 | FRAME 2 | DIFFERENCE BETWEEN FRAMES |
|-------|---------|---------|---------------------------|
| P11   | 23      | 23      | 0                         |
| P12   | 22      | 22      | 0                         |
| P13   | 25      | 25      | 0                         |
| P21   | 100     | 80      | -10                       |
| P22   | 50      | 80      | 30                        |
| P23   | 40      | 50      | 10                        |

DOT CLOCK

HORIZONTAL
SAMPLING
ENABLE SIGNAL

HORIZONTAL
PULSE

→ TIME

HORIZONTAL
PULSE

VERTICAL
ENABLE SIGNAL

VERTICAL
PULSE

→ TIME

DOT CLOCK

HORIZONTAL
SAMPLING
ENABLE SIGNAL

VERTICAL
SAMPLING
ENABLE SIGNAL

AND GATE
OUTPUT SIGNAL

OR GATE
OUTPUT SIGNAL

FIG.45A
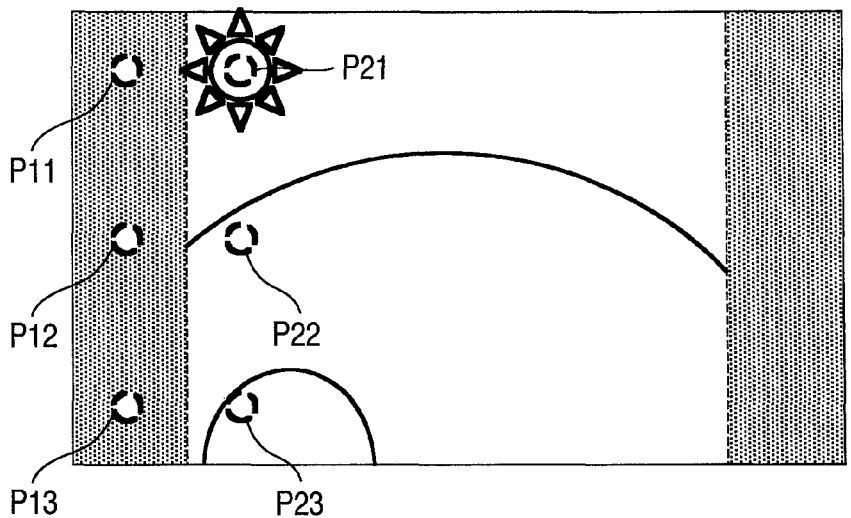
FIG.45B
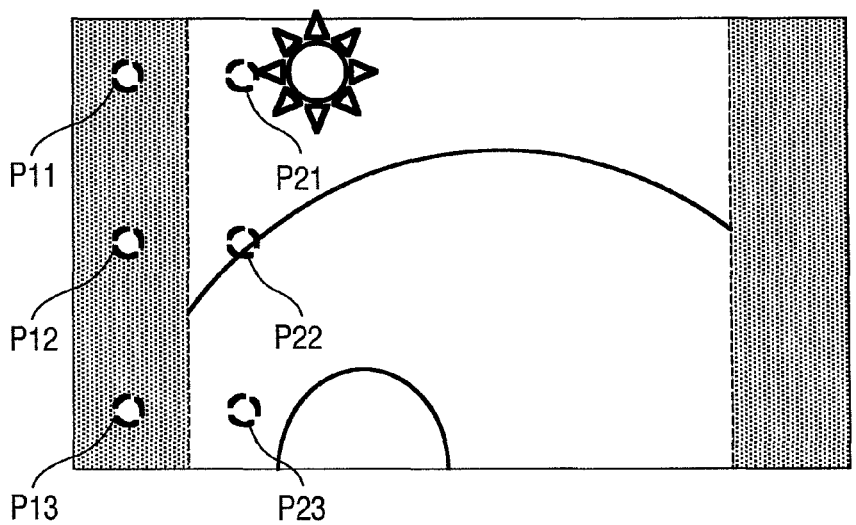
FIG.45C
| POINT | FRAME 1 | FRAME 2 | DIFFERENCE BETWEEN FRAMES |
|---|---|---|---|
| P11 | 0 | 0 | 0 |
| P12 | 0 | 0 | 0 |
| P13 | 0 | 0 | 0 |
| P21 | 100 | 80 | -10 |
| P22 | 50 | 80 | 30 |
| P23 | 40 | 50 | 10 |

VIDEO PROCESSING APPARATUS WITH CORRECTOR FOR CORRECTING AN INPUT VIDEO SIGNAL

CROSS REFERENCE TO RELATED APPLICATION

This application is a continuation of U.S. application Ser. No. 11/602,956, filed Nov. 22, 2006, now U.S. Pat. No. 7,952,645, the contents of which are incorporated herein by reference.

INCORPORATION BY REFERENCE

This application claims the benefit of priority of Japanese Application No. 2005-338000 filed Nov. 24, 2005, the disclosure of which also is entirely incorporated herein by reference.

TECHNICAL FIELD

The present invention relates to a video processing apparatus which is supplied with a video image and which can be viewed, and a mobile terminal apparatus.

BACKGROUND

An example of a multimedia computer system which converts an input RGB signal to a luminance signal and a color-difference signal, extracts a characteristic point in the luminance signal every frame, corrects the luminance signal and the color-difference signal, and conducts display is disclosed in JP-A-2002-132225 (page 4 and FIG. 1).

Furthermore, it is disclosed in JP-A-2005-26814 to provide a side panel detection circuit which detects a side panel and conduct picture quality according to a result of the side panel detection and a result of video luminance level detection.

SUMMARY

In application to a mobile terminal apparatus which operates with a battery, correcting the luminance signal and the color-difference signal every frame increases power consumption. While one is out, an opportunity to charge the mobile terminal apparatus cannot be obtained sometimes. If the power consumption increases, therefore, the use time becomes short, resulting in poor convenience in use. Furthermore, if sunlight is incident on a display device, it becomes hard to watch images, resulting in a problem that the mobile terminal apparatus is hard to use outdoors or the like.

When converting contents having an aspect ratio of, for example, 4:3 to a video signal having an aspect ratio of 16:9 and corresponding to an image which is long sideways, for example, in a broadcasting station, wallpapers are added to the left and right of the contents sometimes. If such a video signal is subjected to picture quality correction, then luminance and colors of the wallpaper portions are changed according to the contents of the video signal and consequently there is a risk that the image becomes rather hard to watch and the convenience in user's use becomes worse.

In addition, if black no-picture areas are added to the left and right sides of the contents having the aspect ratio of 4:3, luminance and color information of the black no-picture areas are confused. This results in a problem that average values of luminance and color of the 4:3 contents themselves cannot be calculated accurately.

Therefore, an object of the present invention is to provide a video processing apparatus and a mobile terminal apparatus improved in convenience in use.

A video processing apparatus according to the present invention includes a detector which detects whether pattern portions such as wallpaper portions having a pattern or the like or no-picture area portions which have a single color are contained besides contents in a video signal input thereto, and a corrector which corrects the video signal. If the pattern portions are contained in the input video signal, the corrector is controlled so as not to correct the video signal.

Other objects, features and advantages of the invention will become apparent from the following description of the embodiments of the invention taken in conjunction with the accompanying drawings.

BRIEF DESCRIPTION OF THE DRAWINGS

FIGS. 23A to 23D are diagrams showing characteristic examples of input gradation versus output gradation in luminance signal;

FIG. 29 is a diagram showing positions of pattern portion detection points in a display device;

FIGS. 30A to 30C show an example of internal waveforms of a pattern portion detection circuit;

FIGS. 31A to 31C show an example of internal waveforms of a pattern portion detection circuit;

FIGS. 35A to 35C show an example of an input video signal;

FIGS. 36A to 36C show an example of an input video signal;

FIGS. 45A to 45C show an example of an input video signal; and

DESCRIPTION OF THE EMBODIMENTS

The present invention can be applied to a video processing apparatus, such as a portable telephone, a PHS, a PDA, a notebook computer, a mobile TV, and a mobile video recording apparatus and reproduction apparatus. In the ensuing description, however, the portable telephone will be taken as an example.

(First Embodiment)

Figure 1:
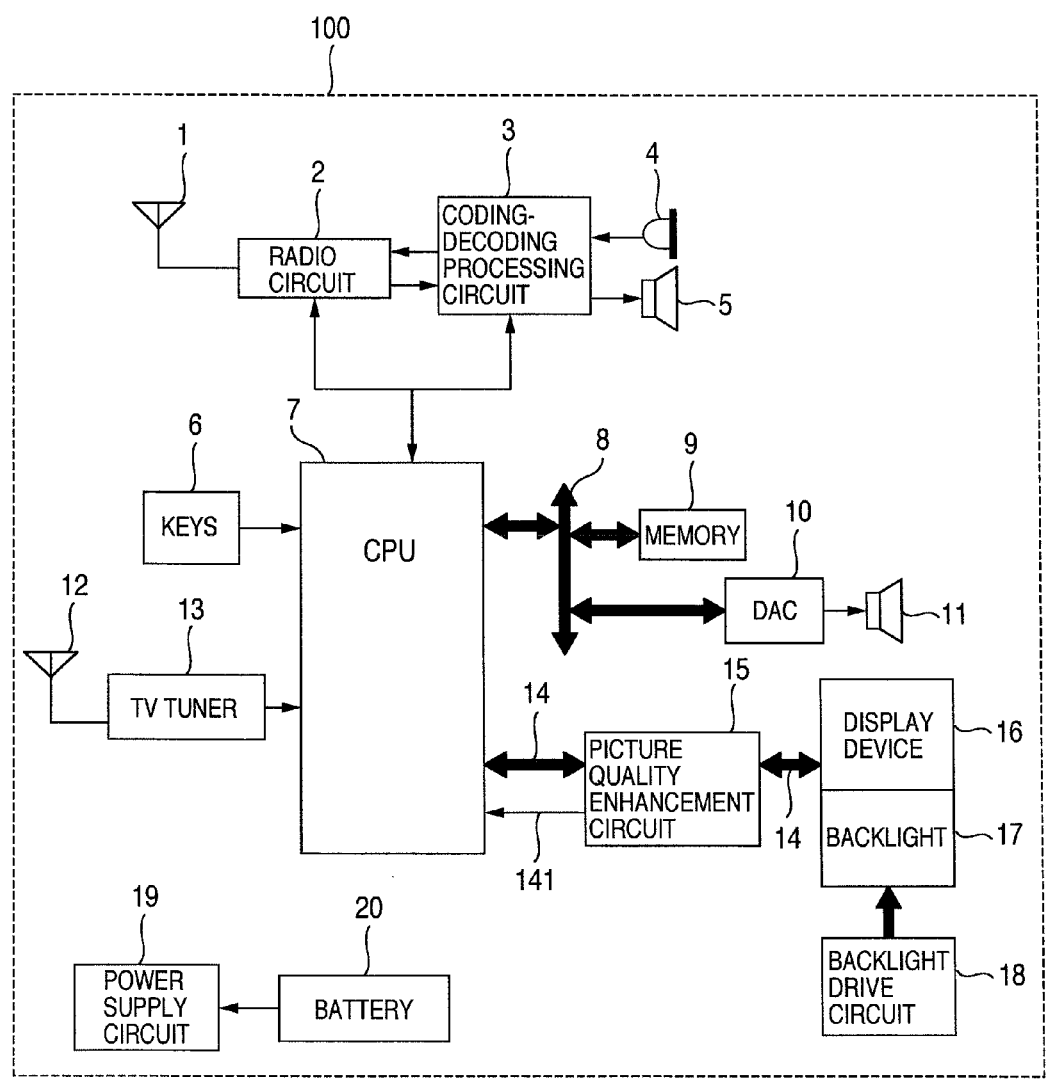
FIG. 1 is a block diagram showing a configuration example of a portable telephone.

FIG. 1 is a block diagram showing a configuration example of a portable telephone. A communication antenna 1 receives a radio wave transmitted through the air, converts the radio wave to a high frequency electric signal, and inputs the high frequency electric signal to a radio circuit 2. Furthermore, the antenna 1 converts a high frequency electric signal output from the radio circuit 2 to a radio wave, and emits the radio wave. On the basis of an order issued by a CPU (Central Processing Unit) 7, the radio circuit 2 demodulates the high frequency electric signal received by the communication antenna 1, and inputs a resultant signal to a coding-decoding processing circuit 3. Furthermore, the radio circuit 2 conducts modulation processing on an output signal of the coding-decoding processing circuit 3 to convert it to a high frequency electric signal, and outputs the high frequency electric signal to the communication antenna 1. Under the control of the CPU 7, the coding-decoding processing circuit 3 conducts decoding processing on the output signal of the radio circuit 2, outputs talking voice signal to a receiver 5, and outputs character and image data to the CPU 7. Furthermore, the coding-decoding processing circuit 3 conducts coding processing on voice input from a microphone 4 or character and image data edited by the user who operates keys 6. In the present embodiment, keys are used to as an operation unit used to input information or an order. However, the operation unit is not restricted to keys, but a voice input unit or a touch panel input unit may be used.

The CPU 7 conducts general processing of the portable telephone. For example, the CPU 7 acquires a program from a memory 9 via a CPU bus 8, and waits for call incoming by controlling the coding-decoding processing circuit 3, the radio circuit 2, and the communication antenna 1. Besides the program, fixed patterns recorded in the portable telephone previously, a call incoming tone such as a melody, personal information such as a telephone directory or an address book, and downloaded call incoming melody and image data are stored in the memory 9. Upon call incoming, the CPU 7 reads out a caller's name, a call incoming melody, and a call incoming image, outputs voice data from a speaker 11 via a DAC (Digital Analog Converter) 10, and displays image data on a display device 16 via a video I/F (Interface) 14 and a picture quality enhancement circuit 15 to notify a user of call incoming. And it becomes possible for the user to conduct talking and conduct mail transmission and reception by operating the keys 6.

A TV antenna 12 converts a received TV broadcast radio wave to a high frequency electric signal and outputs the high frequency electric signal to a TV tuner 13. The TV tuner 13 conducts demodulation processing on the input signal, thereby converts the input signal to an electric signal of CMOS level, and outputs the electric signal to the CPU 7. The CPU 7 initializes the TV tuner 13 and orders station selection. In response to a request from the CPU 7, the tuner 13 periodically transmits information indicating the reception state such as a bit rate error to the CPU 7.

The CPU 7 conducts video-audio separation processing on a signal input from the TV tuner 13 and conducts video decoding processing and audio decoding processing. The video image is displayed on the display device 16 via the picture quality enhancement circuit 15. The voice is reproduced by the speaker 11 via the DAC 10. As a result, the user can view and listen to the TV broadcast. The received TV broadcast may be either of analog broadcast and digital broadcast. In the present embodiment, the CPU 7 includes an interface to which the output of the TV tuner 13 can be directly coupled. However, this is not restrictive, but a circuit for interface conversion may be used. The interface conversion circuit may be mounted on the CPU or may be mounted in a stack form. If an image processing apparatus such as an application processor or a coprocessor is mounted on a portable telephone, then the interface conversion circuit may be mounted on the same silicon chip as the processor or may be mounted in a stack form of a different silicon chip. The interface conversion circuit may be mounted in a controller or a driver IC of the display device 16 and in the TV tuner 13. As for the connection part between the interface conversion circuit and the CPU 7, dedicated terminals may be provided on the CPU 7 or the interface conversion circuit may be connected to the CPU bus 8.

A battery 20 is formed of a chargeable secondary battery such as a lithium ion battery or a nickel hydrogen battery. The battery 20 supplies power required for components included in the portable telephone to operate. A power supply circuit 19 supplies voltages to components in the portable telephone on the basis of power supplied from the battery 20. If the residual quantity of the battery becomes small, the battery 20 is charged by power supplied from a home outlet or a car battery. In FIG. 1, illustration of connections between the components in the portable telephone and the power supply circuit 19 is omitted.

The picture quality enhancement circuit 15 conducts picture quality enhancement processing on the video signal output from the CPU 7, and outputs a resultant video signal to the display device 16. A backlight 17 generates illumination light for the display device 16 on the basis of power supplied from a backlight drive circuit 18, and illuminates the display device 16. For example, a cathode-ray tube, a white-colored LED, or three-color LEDs of red, green and blue are used as the light source for the backlight 17. The backlight drive circuit 18 steps up or steps down the voltage supplied from the power supply circuit 19 or the battery 20 in order to drive the backlight 17. The backlight drive circuit 18 can adjust the brightness and color under the control of the CPU 7. The backlight drive circuit 18 may be formed independently as shown in FIG. 1, or may be formed as a part of the power supply circuit 19. For example, if the power supply circuit 19 is formed as an LSI, the backlight drive circuit 18 may be mixedly mounted on the same silicon chip or may be mounted in a stack form of a separate silicon chip.

Figure 2:
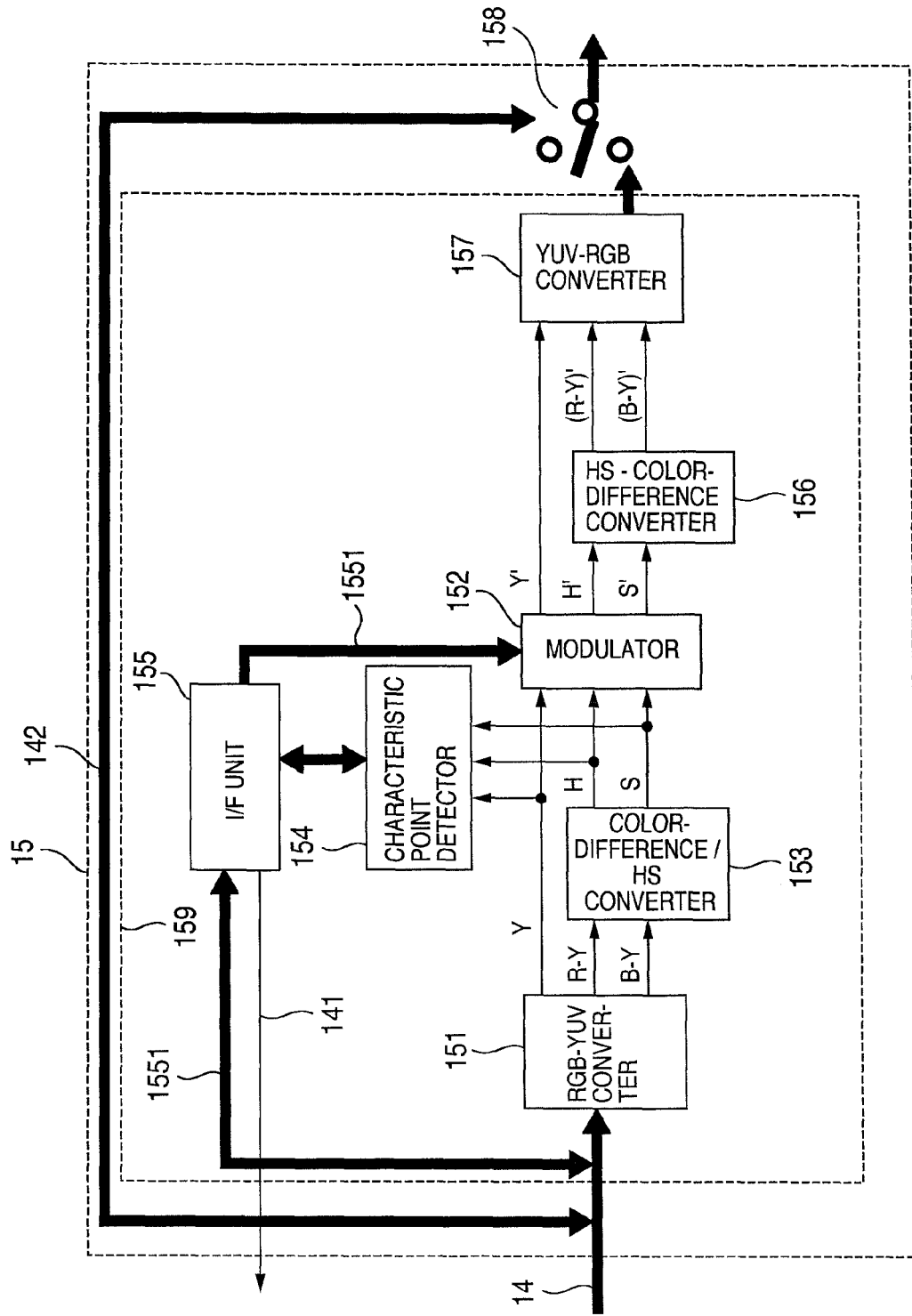
FIG. 2 is a block diagram showing a configuration example of a picture quality enhancement circuit.

A block diagram showing a configuration example of the picture quality enhancement circuit 15 is shown in FIG. 2. An RGB-YUV converter 151 converts the video signal of the RGB form to a luminance signal and color-difference signals, and outputs the luminance signal as Y and the color-difference signals as R−Y and B−Y.

The conversion of the video signal of the RGB form to the YUV signals can be conducted according to the following equations.

$$Y = 0.290R + 0.5870 \times G + 0.1140 \times B \quad (1)$$

$$Cb = (-0.1687) \times R + (-0.3313) \times G + 0.5000 \times B \quad (2)$$

$$Cr = 0.5000 \times R + (-0.4187) \times G + (-0.0813) \times B \quad (3)$$

A color difference—HS converter 153 conducts hue conversion and saturation conversion on the color-difference signals R−Y and B−Y input from the RGB-YUV converter 151, and outputs hue H and saturation S. A characteristic point detector 154 calculates characteristic data such as a minimum level, an average level, a maximum level and a histogram of the input video signal on the basis of the luminance signal Y input from the RGB-YUV converter 151 and the hue H and the saturation S input from the color difference—HS converter 153. The characteristic point detector 154 writes the characteristic data into an I/F unit 155. The I/F unit 155 issues an interrupt signal 141 to the CPU 7 at predetermined timing. Upon detecting the interrupt signal 141, the CPU 7 reads out the characteristic data stored in the I/F unit 155 via an internal bus 1551, determines correction data according to a predetermined algorithm, and writes the correction data into the I/F unit 155 via the internal bus 1551. A modulator 152 conducts modulation based on the correction data written into the I/F unit 155 by the CPU 7 on the input luminance signal Y, hue H and saturation S, and outputs results as luminance Y', hue H' and saturation S'. An HS-color-difference converter 156 converts the input hue H' and saturation S' signals to color-difference signals (R−Y)' and (B−Y)' and outputs the color-difference signals (R−Y)' and (B−Y)'. A YUV-RGB converter 157 converts the input luminance signal Y' and color-difference signals (R−Y)' and (B−Y)' to signals having the RGB form, and outputs resultant signals. The YUV-RGV conversion can be conducted according to the following equations.

$$R = Y + 1.402 \times V \quad (4)$$

$$G = Y + (-0.34414) \times U + (-0.71414) \times V \quad (5)$$

$$B = Y + 1.772 \times U \quad (6)$$

A selector 158 selects either the output of the YUV-RGB converter 157 or a through signal 142 supplied from the video I/F 14, and outputs a selected signal to the display device 16. The selector 158 may be controlled by the CPU. The selector 158 may be changed over when the residual quantity of the battery has become equal to or less than a certain definite value. In the case of a portable telephone of open-close type, the selector 158 may be changed over in response to the opening and closing. If the selector 158 is changed over in response to the opening and closing and the portable telephone has a folding shape, it is desirable to select the YUV-RGB converter 157 side when the portable telephone is opened. In the case of a shape which allows viewing a display device in the closed state, as in a portable telephone of two-axis hinge form having a second axis in a direction in which the display device is rotated by 180° besides a rotation axis in a folding direction even if the portable telephone has a sliding, rotating or folding shape, the YUV-RGB converter 157 side may be selected in the selector 158 when the portable telephone is closed. Furthermore, the selector 158 may be changed over according to contents to be displayed. For example, the YUV-RGB converter 157 side is selected in the selector 158 when viewing TV, a still picture or a moving picture. The through signal 142 may be selected in the waiting state regardless of the shape of the portable telephone or the opening-closing state. By the way, the term "contents" means, for example, video information of a drama, a movie, a sport or the like.

By the way, in the case where text data such as a mail text or a caption is input, then processing such as the RGB-YUV conversion in the picture quality enhancement circuit 15 is not needed and consequently the CPU 7 exercises control so as to select the through signal 142. In this case, operation of a portion surrounded by a dotted line 159 is stopped. As a result, the power consumption can be reduced. Specifically, operation clock supply to the picture quality enhancement circuit 15 is stopped, or supply of power to blocks surrounded by the dotted line 159 is stopped. When stopping the supply of power, the output of the power supply circuit 19 may be stopped, or the supply of power may be stopped by providing a switch on the picture quality enhancement circuit 15 side to cut off a power absorbing path.

Figure 3:
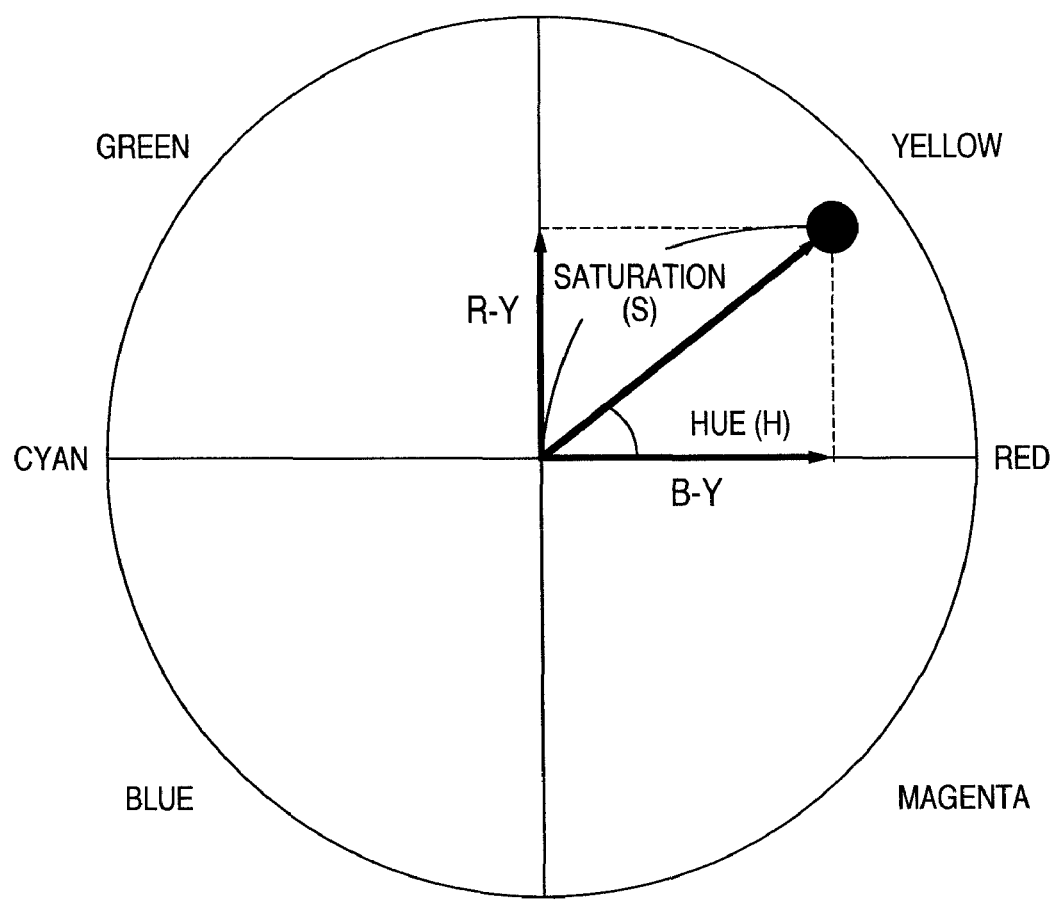
FIG. 3 is a characteristic diagram showing a relation between color-difference and saturation.

Outline of operation conducted by the color difference—HS converter 153 will now be described with reference to drawings. FIG. 3 is a characteristic diagram showing relations between the hue (H) and the saturation (S). The abscissa represents the level of the B−Y signal, and the ordinate represents the level of the R−Y signal. A vector sum of the B−Y signal and the R−Y signal is a vector which represents the hue and the saturation, and its angle represents the hue H and its magnitude represents the saturation S. Therefore, the hue H can be found using equation (7) and the saturation S can be found using equation (8).

$$H = \tan^{-1}((R-Y)/(B-Y)) \quad (7)$$

$$S = SQR((R-Y)2 + (B-Y)2) \quad (8)$$

Figure 4:
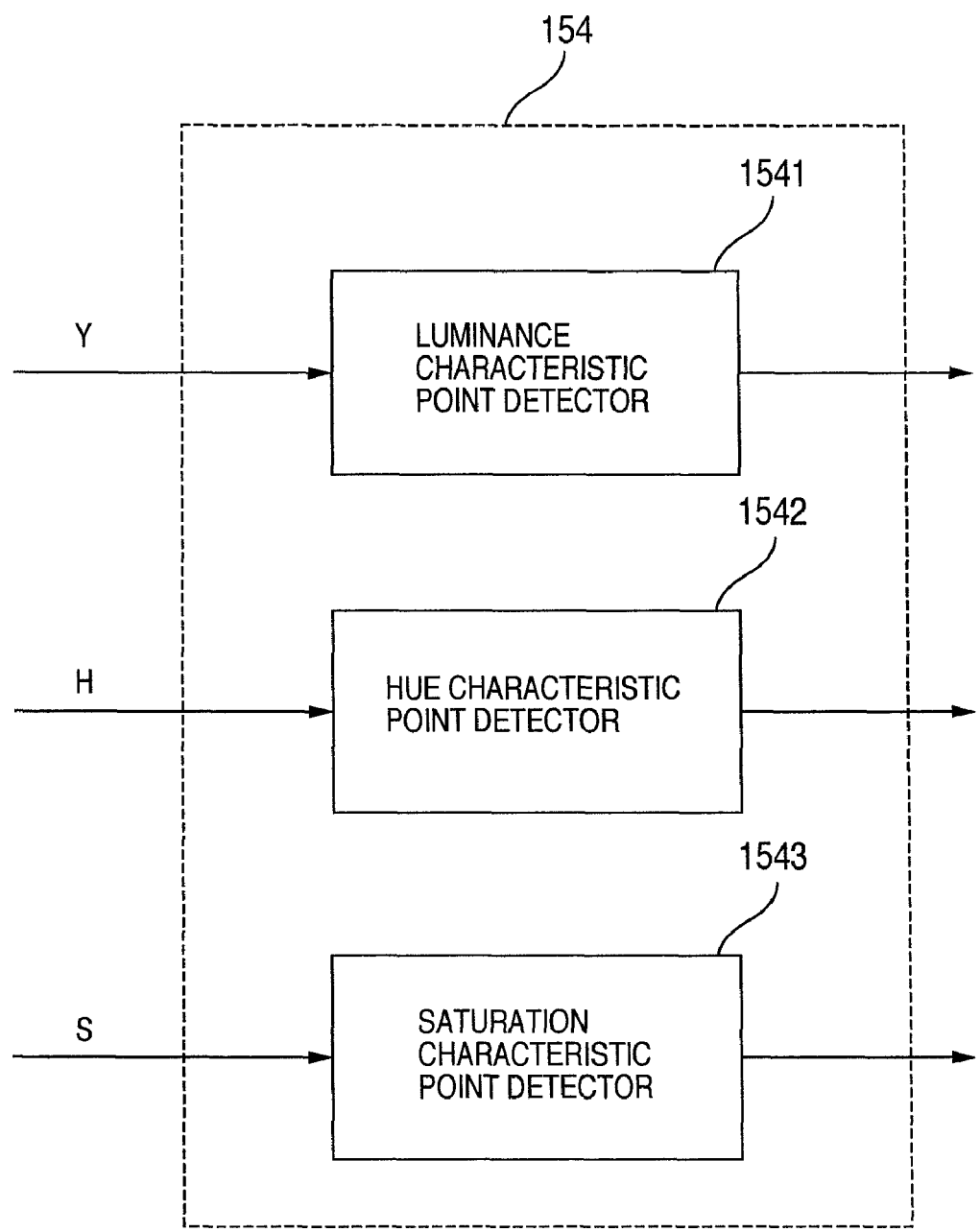
FIG. 4 is a block diagram showing a configuration example of a characteristic point detector.
Figure 5:
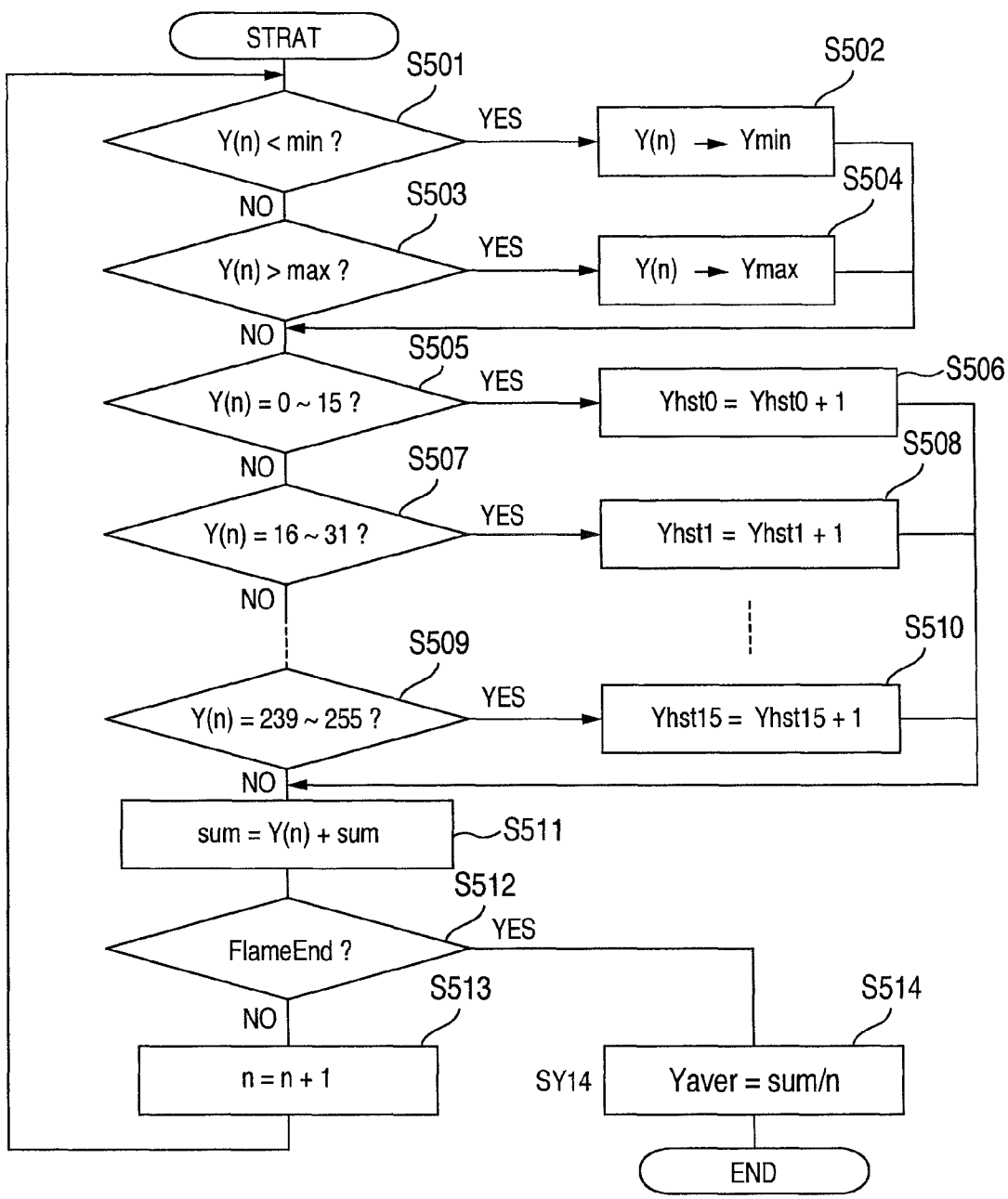
FIG. 5 is a flow diagram showing an example of detection processing conducted in a luminance characteristic point detector.

As shown in FIG. 4, the characteristic point detector 154 includes, for example, a luminance characteristic point detector 1541, a hue characteristic point detector 1542 and a saturation characteristic point detector 1543. FIG. 5 is a flow diagram showing an example of detection processing conducted by the luminance characteristic point detector 1541. As shown in the flow diagram, the luminance characteristic point detector 1541 makes a level decision on the luminance signal Y input thereto momentarily by taking a frame as the unit, and acquires characteristic data such as a maximum level, a minimum level, a level frequency of every area and an average level. With reference to FIG. 5, a detection processing example in the case where the input gradation of the luminance level is in the range of 0 to 255 and the input gradation is gradation areas of 16 stages will now be described. However, the detection processing is not restricted to this. For example, 8 stages, 32 stages or the like can be freely set in a range in which resources such as a memory and a gate capacitance are provided. By the way, a detection processing program to be executed by the luminance characteristic point detector 1541 may be stored in the memory 9, or may be stored in a memory provided in the luminance characteristic point detector 1541.

First, comparison is conducted to determine whether a luminance level Y(n) at an nth pixel is lower than a minimum level Ymin stored in the memory 9 (S501). As initial values of the minimum level Ymin and a maximum level Ymax, 255 and 0 are previously stored in the memory 9. If the luminance level is lower than the current minimum level, the luminance level at the nth pixel is stored in the memory 9 as the minimum level (S502). If the luminance level is at least the minimum level, comparison is conducted to determine whether the luminance level at the nth pixel is higher than the maximum level (S503). If the luminance level is higher than the maximum level, then the luminance level at the nth pixel is stored as the maximum level (S504). If the luminance level is equal to the maximum level or less, then a decision is made whether the luminance level at the nth pixel is in the range of 0 to 15 (S505). If the luminance level is in the range of 0 to 15, then 1 is added to a value of Yhst0 (S506). Yhst0 indicates the number of luminance levels included in the gradation area ranging from 0 to 15.

If the luminance level is not in the range of 0 to 15, then a decision is made whether the luminance level is in the range of 16 to 31 (S507). If a result of the decision is yes, then 1 is added to a value of Yhst (S508). If the result of the decision is no, then a decision is made whether the decision level is included in another gradation area successively.

If the area determination of the luminance level is finished, then the luminance level at the nth pixel is added to the current total luminance level (S511). At S512, a decision is made whether processing corresponding to one frame is completed. If a result of the decision is yes, an average luminance level is calculated by dividing the total luminance level by the number n of pixels and the processing is finished (S514). If the result of the decision is no, then 1 is added to n (S513) and the processing returns to S501 and processing for the luminance level at the next pixel is conducted.

Figure 6:
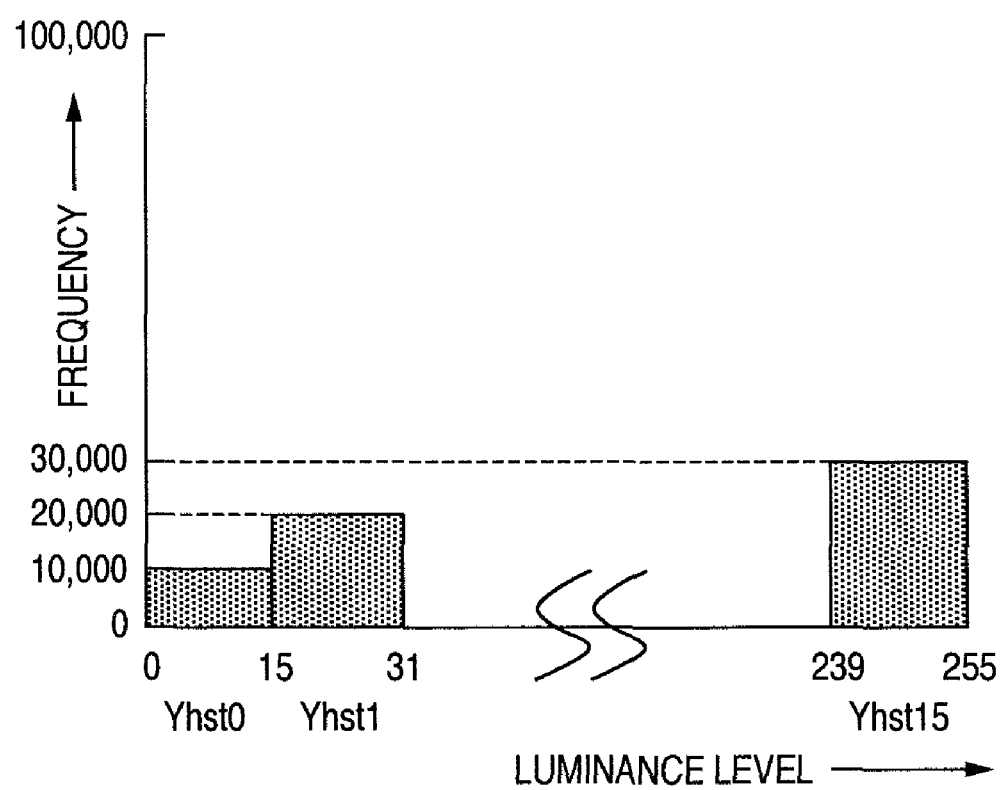
FIG. 6 is an example of a luminance histogram.

FIG. 6 shows an example of a luminance histogram. The abscissa indicates areas of the luminance histogram, and the ordinate indicates the frequency. By acquiring this histogram, characteristics of the luminance can be grasped easily. For example, a decision can be made whether the picture is a simply dark picture or a picture having a bright place such as a moon or a star in a dark picture.

Figure 7:
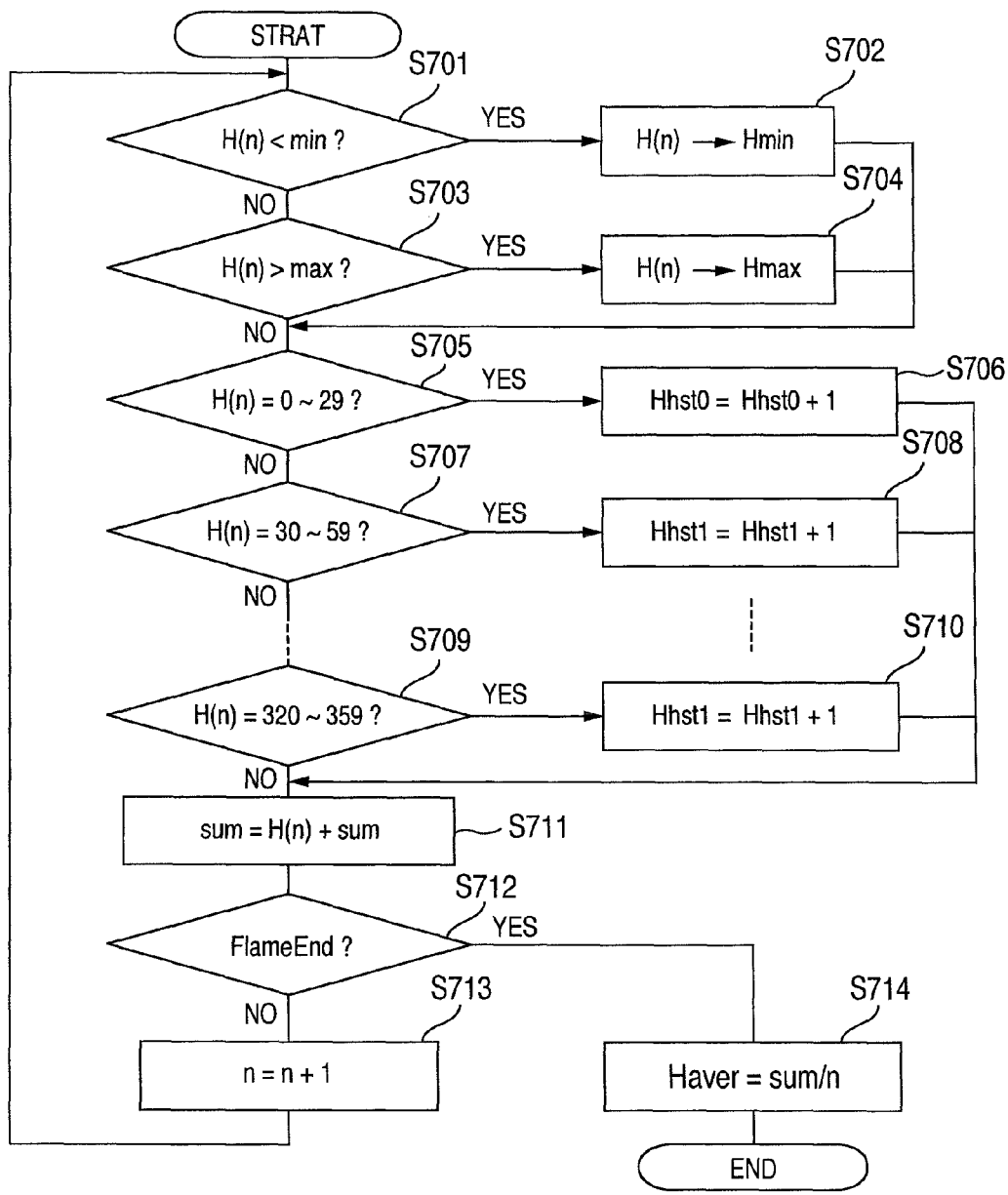
FIG. 7 is a flow diagram showing an example of detection processing conducted in a hue characteristic point detector.

FIG. 7 is a flow diagram showing an example of detection processing conducted by the hue characteristic point detector 1542. As shown in the flow diagram, the hue characteristic point detector 1542 makes a level decision on the hue signal H input thereto momentarily by taking a frame as the unit, and acquires a maximum level, a minimum level, a level frequency of every area and an average level. With reference to FIG. 7, a detection processing example in the case where the hue level is in the range of 0 to 359 and the levels are divided into hue areas of 12 stages will now be described. However, the detection processing is not restricted to this. In the same way as the luminance characteristic point detection, a detection processing program to be executed may be stored in the memory 9, or may be stored in a memory provided in the hue characteristic point detector 1542.

In the same way as the luminance level, detection is conducted at S701 to S710 to determine which of hue areas Hhst0 to Hhst11 includes a hue level H(n) at the nth pixel. If the area of the hue level is judged, then the hue level at the nth pixel is added to the current total hue level (S711) and a decision is made whether processing corresponding to one frame is completed (S712). If the processing is completed (yes), the average hue level is calculated and the processing is finished (S714). If the result of the decision is no, then 1 is added to n (S713) and the processing returns to S701 and processing for the hue level at the next pixel is conducted.

Figure 8:
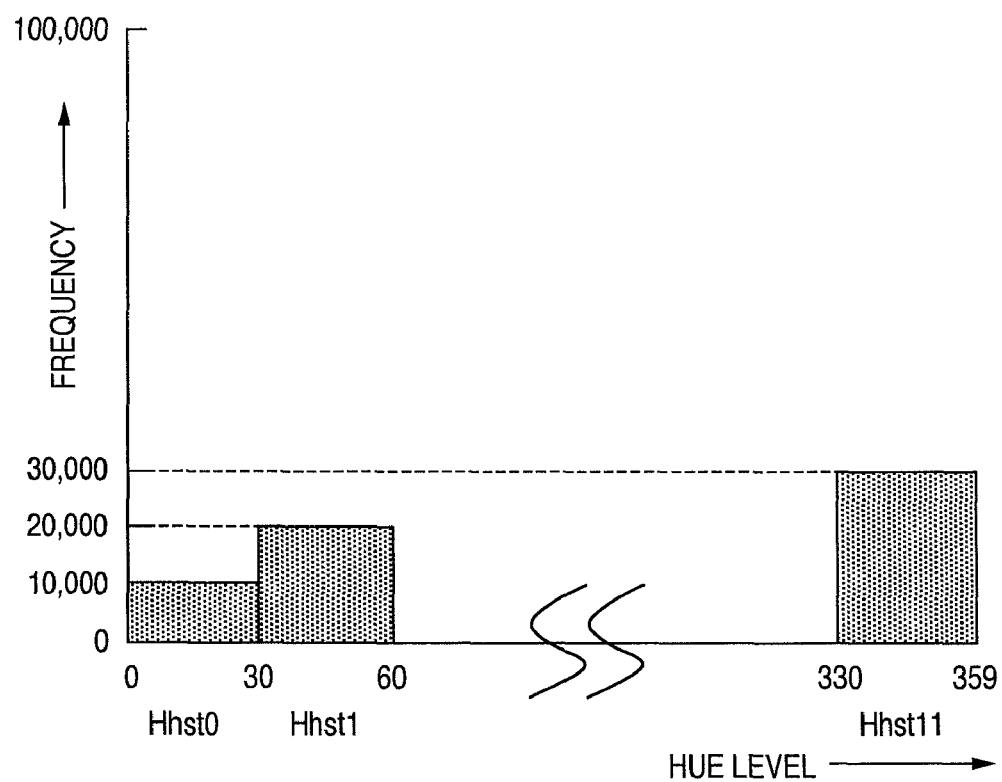
FIG. 8 is an example of a hue histogram.

FIG. 8 shows an example of a hue histogram generated by using the area frequency detected as described heretofore. The abscissa indicates areas of the hue histogram, and the ordinate indicates the frequency. By generating this histogram, characteristics of the hue change can be grasped easily.

Figure 9:
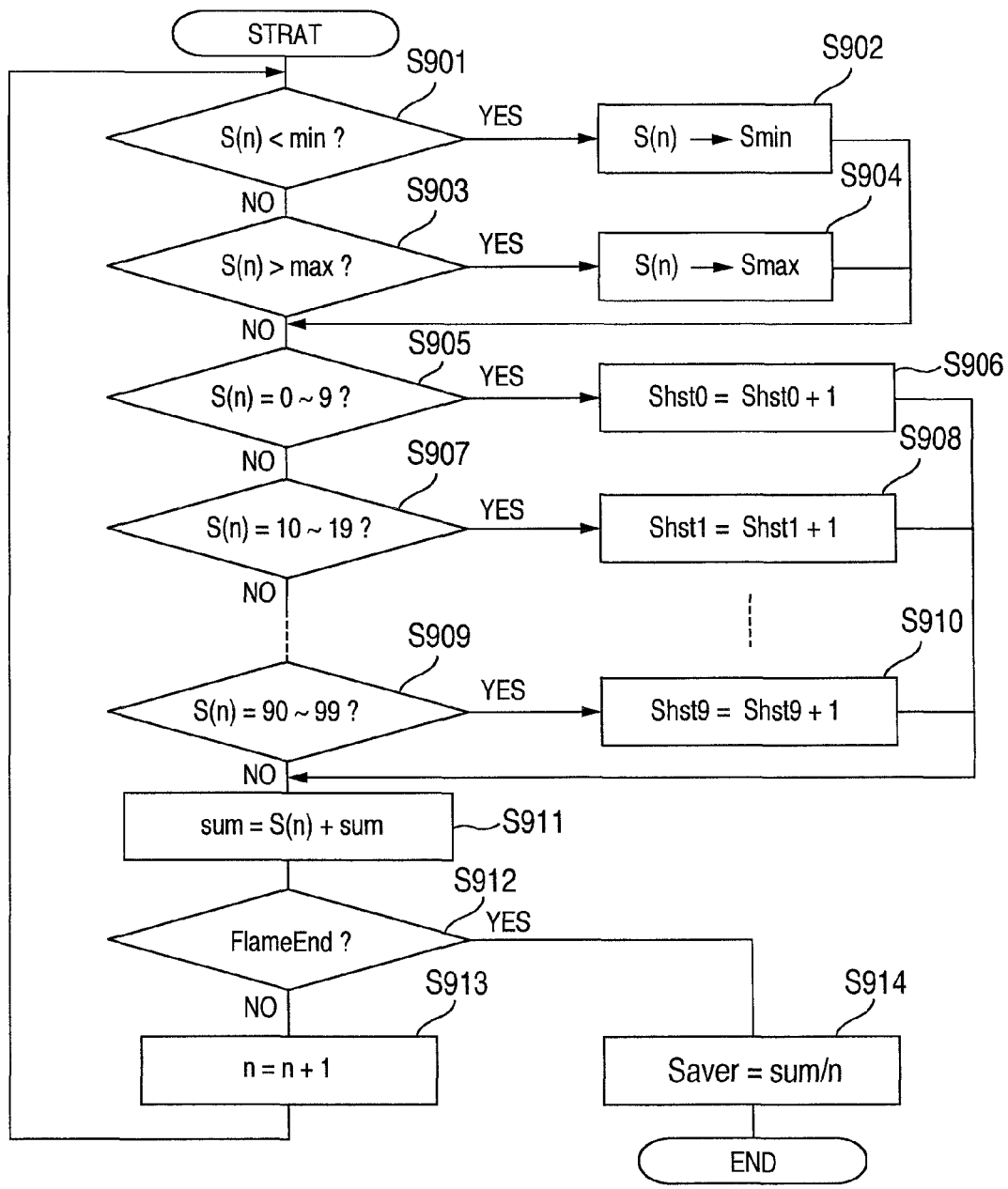
FIG. 9 is a flow diagram showing an example of detection processing conducted in a saturation characteristic point detector.

FIG. 9 is a flow diagram showing an example of detection processing conducted by the saturation characteristic point detector 1543. The saturation characteristic point detector 1543 makes a level decision on the saturation signal S input thereto momentarily by taking a frame as the unit, and acquires a maximum level, a minimum level, a level frequency of every area and an average level. With reference to FIG. 9, a detection processing example in the case where the saturation level is in the range of 0 to 99 and the levels are divided into areas of 12 stages will now be described. However, the detection processing is not restricted to this. In the same way as the luminance characteristic point detection, a detection processing program to be executed may be stored in the memory 9, or may be stored in a memory provided in the saturation characteristic point detector 1543.

In the same way as the luminance level, detection is conducted at S901 to S910 to determine which of saturation areas Shst0 to Shst19 includes a saturation level S(n) at the nth pixel. If the area of the saturation level is judged, then the saturation level at the nth pixel is added to the current total saturation level (S911) and a decision is made whether processing corresponding to one frame is completed (S912). If the processing is completed (yes), the average saturation level is calculated and the processing is finished (S914). If the result of the decision is no, then 1 is added to n (S913) and the processing returns to S901 and processing for the saturation level at the next pixel is conducted.

Figure 10:
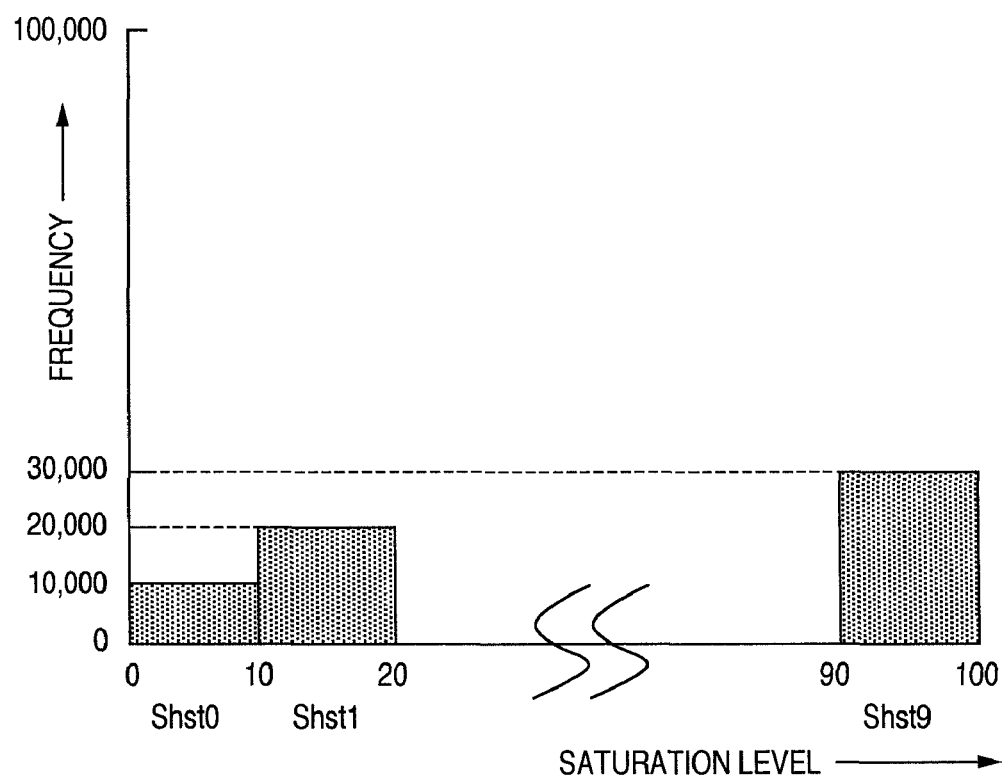
FIG. 10 is an example of a saturation histogram.

FIG. 10 shows an example of a saturation histogram. The abscissa indicates areas of the saturation histogram, and the ordinate indicates the frequency. By acquiring this saturation histogram, the saturation change of the input video signal can be detected.

Figure 11:
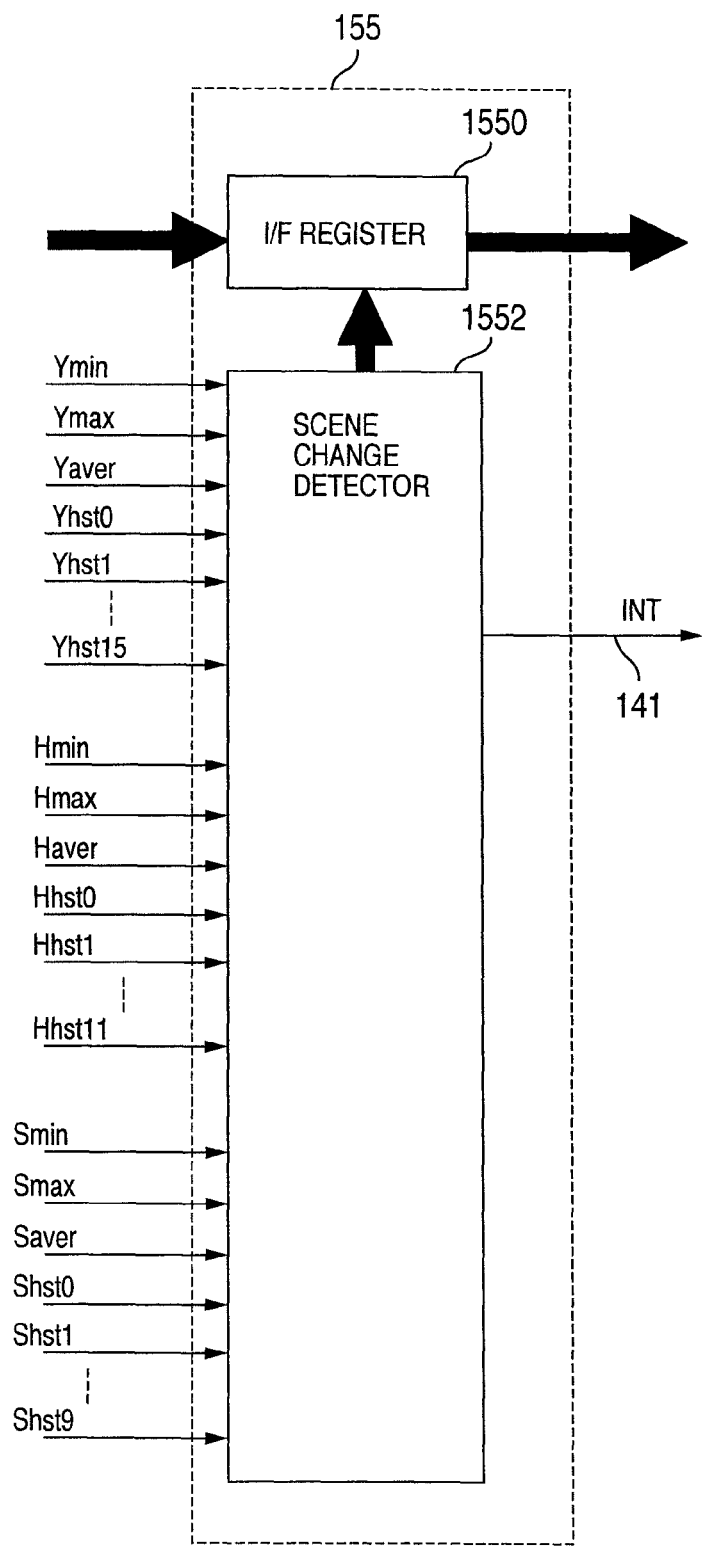
FIG. 11 is a flow diagram showing a configuration example of an I/F unit.

FIG. 11 is a block diagram showing an example of an internal configuration of the I/F unit 155. The I/F unit 155 conducts signal writing and reading between the CPU 7 and the picture quality enhancement circuit 15 via an I/F register 1550. Upon being supplied with characteristic data such as the luminance level, hue and saturation from the characteristic point detector 154, a scene change detector 1552 preserves these data. Upon being supplied with new data, the scene change detector 1552 rewrites data and makes a decision whether there is a difference between the new data and old data. If there is a difference, the scene change detector 1552 judges that a scene change has occurred, and issues an INT (interruption) 141 to the CPU 7. The CPU 7 reads out new characteristic data from the I/F register 1550, generates new correction data, and updates correction data in the I/F register 1550. In the present example, the CPU 7 reads out characteristic data from the I/F register 1550. Alternatively, the I/F register 1550 may transmit data to the CPU 7. As for the scene change, for example, a change from a program to a CM (commercial message), a change from a daytime scene to a night time scene, a change of the image pickup place, a changeover from a studio image to an on-the-spot image, and a changeover on a TV camera in a studio or a stadium can be mentioned.

Figure 12:
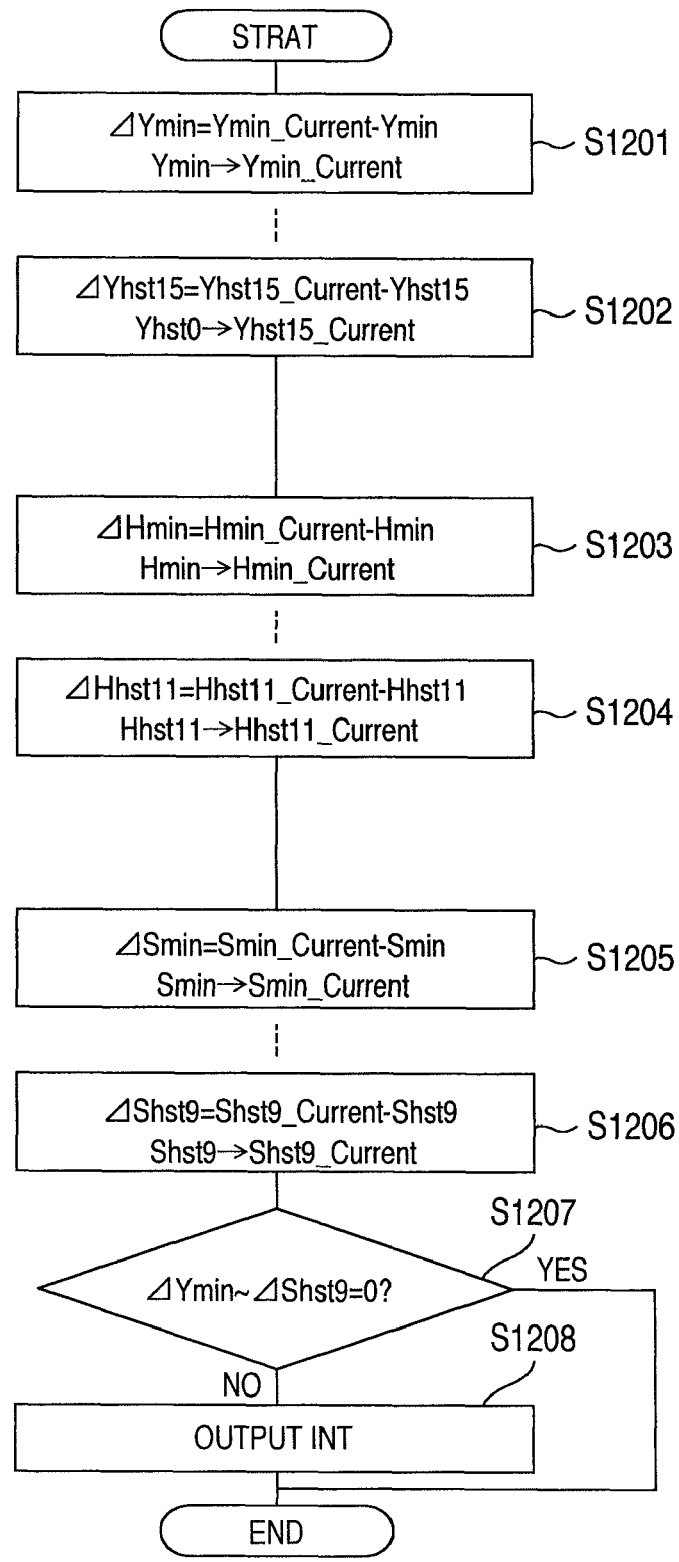
FIG. 12 is a flow diagram showing an example of detection processing conducted in a scene change detector.

FIG. 12 is a flow diagram showing an example of detection processing conducted by the scene change detector 1552. At S1201, a difference between a new minimum luminance level and an old minimum luminance level is found and new data is written into the I/F register 1550. As regards each of a maximum luminance level, an average luminance level and the frequency of every area as well, a difference is found in the same way. If the difference of the frequency in the area 15 is found (S1202), the processing proceeds to processing of the hue characteristic point. As regards the hue as well, the difference of each of the minimum hue level, the maximum hue level, the average hue level, and the frequency is found in the same way as the luminance (S1203 and S1204). The difference at the saturation characteristic point is found (S1205 and S1206). A decision is made whether the difference in luminance, hue and saturation at a characteristic point is "0", i.e., the frame is the same as the preceding frame (S1207). If there is no difference, update of the correction data is judged to be unnecessary and the processing is finished. On the other hand, if the result of the decision is "no", then the scene change detector 1552 judges that a scene change has occurred, outputs the interrupt request 141 to the CPU 7 (S1208), and finishes the processing.

The scene change detector 1552 operates as described above. If the frame is the same in pattern as the preceding frame, therefore, readout of the characteristic data, generation of correction data, and processing of writing into the I/F register 1550 can be omitted. As a result, it is possible to reduce the processing load of the CPU 7 and reduce the current consumption for data transfer.

An example in which differences of all of the luminance, hue and saturation are detected is shown in FIG. 12. However, this is not restrictive. Furthermore, it is not necessary to detect differences for all characteristic data such as the minimum level and the maximum level. For reducing the processing load in the CPU 7, it is most effective to detect a scene change on the basis of whether there is a difference in the average level of the luminance signal which exerts great influence upon the user's vision. Furthermore, for example, when both the minimum level and the maximum level of the luminance have changed, a decision may be made on the basis of a combination of characteristic data such as the minimum level and the average level of hue. A scene change may be judged to occur when the distribution area (abscissa) in the histogram has changed.

In the example shown in FIG. 12, it is judged that there are no scene changes when the difference in characteristic data is 0. Alternatively, it is possible to provide a definite threshold and judge that a scene change has occurred when the threshold is exceeded. It is desirable to set the threshold individually for each of the characteristic data. In order to prevent the correction data from being updated according to whether there is a caption, a specific gradation area or frequency area may be neglected. For example, it may be judged that a scene change has not occurred, even if the frequency in the histogram on the white side has changed. In addition to the case where a scene is detected by using the luminance level or the like, the scene change detector 1552 may judge that a scene change has occurred and output the INT 141 every definite time period or every definite number of frames.

The modulator 152 modulates the luminance, hue and saturation on the basis of the correction data generated by the CPU 7. Hereafter, a method of the modulation will be described.

Figure 13:
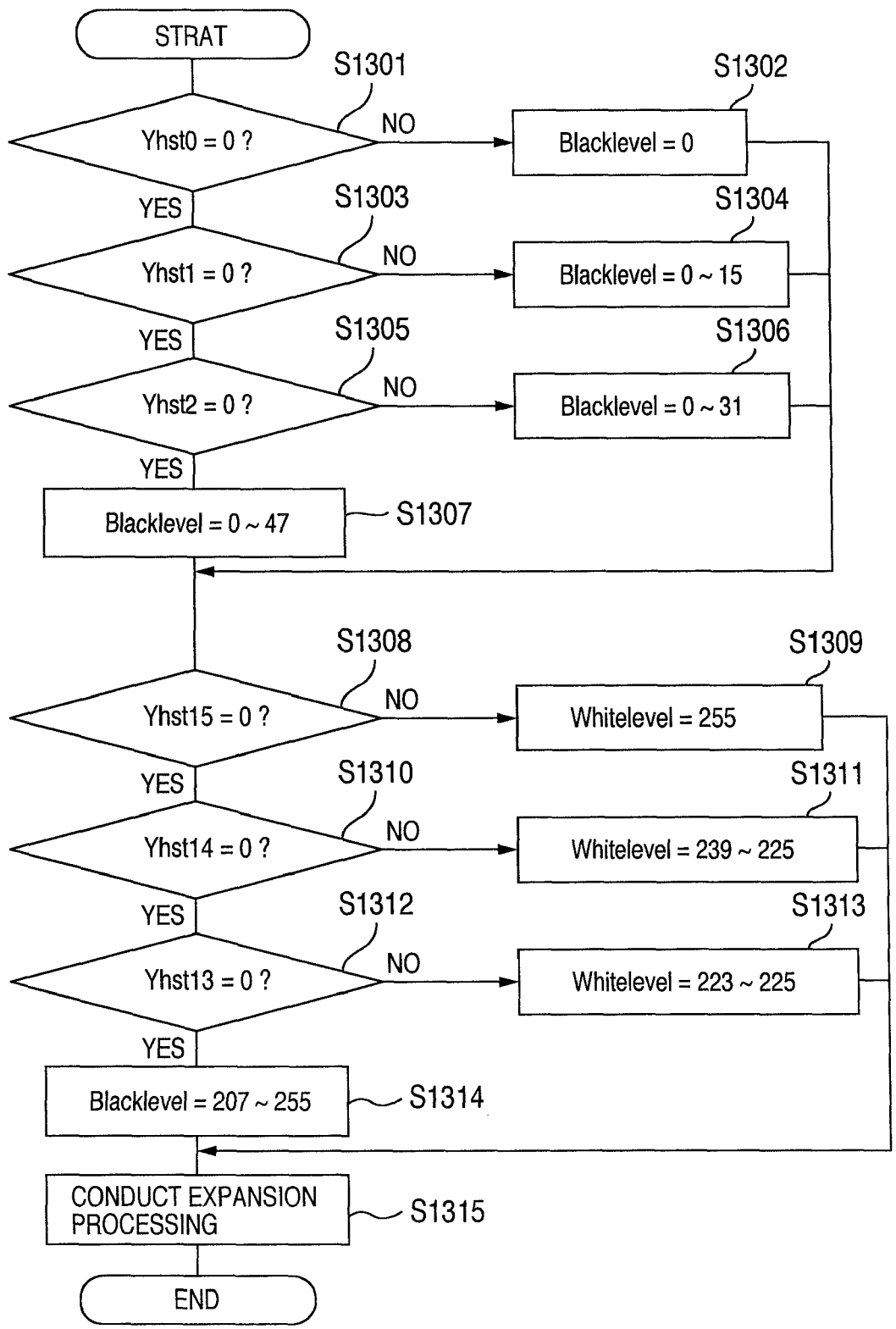
FIG. 13 shows a processing flow example of luminance correction conducted in a modulator.

FIG. 13 shows an example of a flow of processing conducted by the modulator 152 when modulating the luminance signal. First, a decision is made whether the first gradation area (Yhst0) in the luminance histogram is 0 (S1301). If a result of the decision is no, blacklevel is set to 0 (S1302). Here, the term "blacklevel" indicates a range of the input gradation for which the output gradation is fixed to 0. The expression "blacklevel is set to 0" means that there is no range for which the output gradation is set to 0. If the result of the decision is yes, a decision is made whether the second gradation area (Yhst1) in the luminance histogram is 0 (S1303). If a result of the decision is no, the blacklevel is set to 0 to 15 (S1304). If the result of the decision is yes, a decision is made whether the third gradation area (Yhst2) in the luminance histogram is 0 (S1305). If a result of the decision is no, the blacklevel is set to 0 to 31 (S1306). If the result of the decision is yes, a decision as to proceeding to the fourth gradation area (Yhst3) is not made and the blacklevel is set to 0 to 47 (S1307). By thus providing a limit value, it is possible to prevent the luminance from being corrected excessively.

Subsequently, a decision is made whether the sixteenth gradation area (Yhst15) in the luminance histogram is 0 (S1308). If a result of the decision is no, whitelevel is set to 0 (S1309). Here, the term "whitelevel" indicates a range of the input gradation for which the output gradation is fixed to 255. The expression "whitelevel is set to 255" means that there is no range for which the output gradation is set to 255. If a result of the decision is yes, a decision is made whether the fifteenth gradation area (Yhst14) in the luminance histogram is 0 (S1310). If a result of the decision is no, the whitelevel is set to 239 to 255 (S1311). If the result of the decision is yes, a decision is made whether the fourteenth gradation area (Yhst13) in the luminance histogram is 0 (S1312). If a result of the decision is no, the whitelevel is set to 223 to 255 (S1313). If the result of the decision is yes, a decision as to the thirteenth gradation area (Yhst12) in the luminance histogram is not made and the whitelevel is set to 207 to 255 (S1314). By thus providing a limit value on the white side, it is possible to prevent excessive correction.

If the range for which the output gradation is fixed to 0 or 255 is determined, then expansion processing is conducted so as to use gradation ranging from 0 to 255 which can be output, with respect to the input gradation except gradation portions (collapsed portions by saturation) for which the gradation on the black side and the gradation on the white side are respectively fixed to 0 and 255 (S1315). As a result, correction can be conducted so as to make the gradient (Ygain) of the output gradation relative to the input gradation large.

An example of modulation method of the luminance signal used in the modulator 152 will now be described with reference to FIGS. 14A to 16B.

Figure 14A:
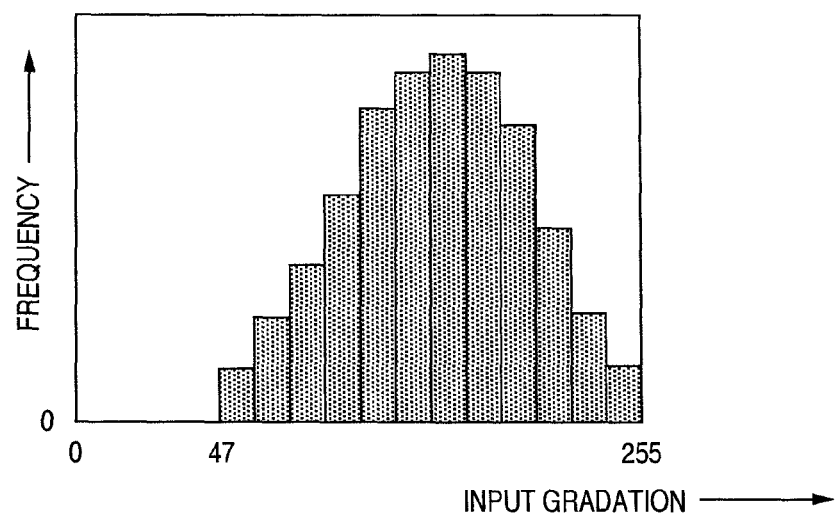
FIGS. 14A and 14B show an example of a luminance histogram and an example of correction characteristics, respectively.

FIG. 14A is a luminance histogram. In this example, a gradation range of 0 to 47 (Yhst0 to Yhst2) on the black side is not present. In other words, this example corresponds to the case where a video signal carrying a whitish image (the black level is floaty) in which black is scarce is input. Applying to the processing flow shown in FIG. 13, it follows that blacklevel=0 to 47 and whitelevel=255. By conducting the expansion processing, correction to the gradient Ygain=1.22 is performed. The corrected relation of the output gradation to the input gradation is referred to as corrected characteristics.

Figure 14B:
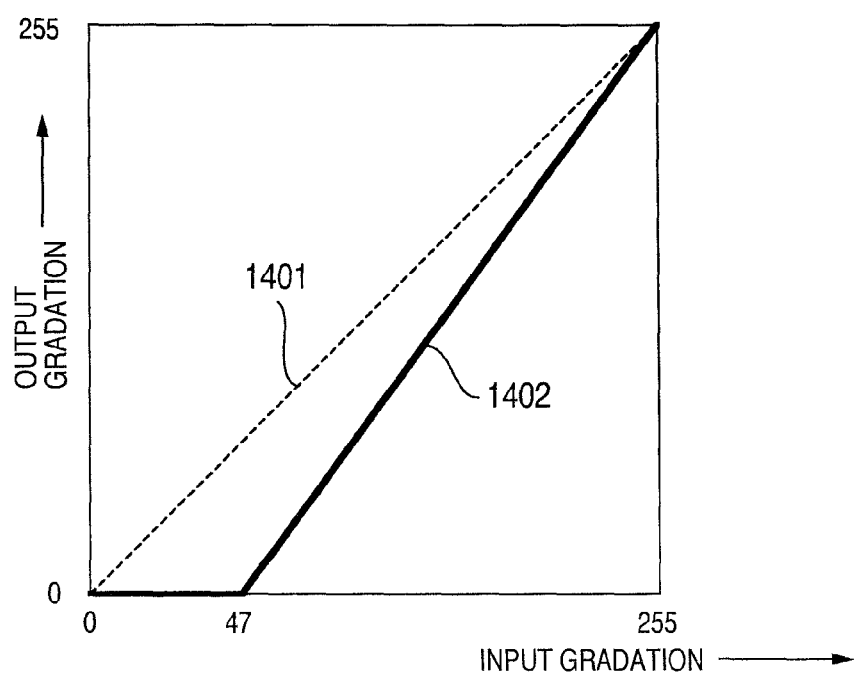

FIG. 14B shows a correction image using the correction characteristics. A dotted line 1401 indicates characteristics of the output gradation relative to the input gradation in the case where the correction is not conducted. A solid line 1402 indicates correction characteristics. Since the output gradation is fixed to 0 in the range of 0 to 47 for which the gradation in the input video signal is not present, the gradient of the output gradation relative to the input gradation in the range of 47 to 255 becomes great. As a result, it is possible to make the contrast of the output gradation relative to the input gradation large and display an image which is easy to view.

Figure 15A:
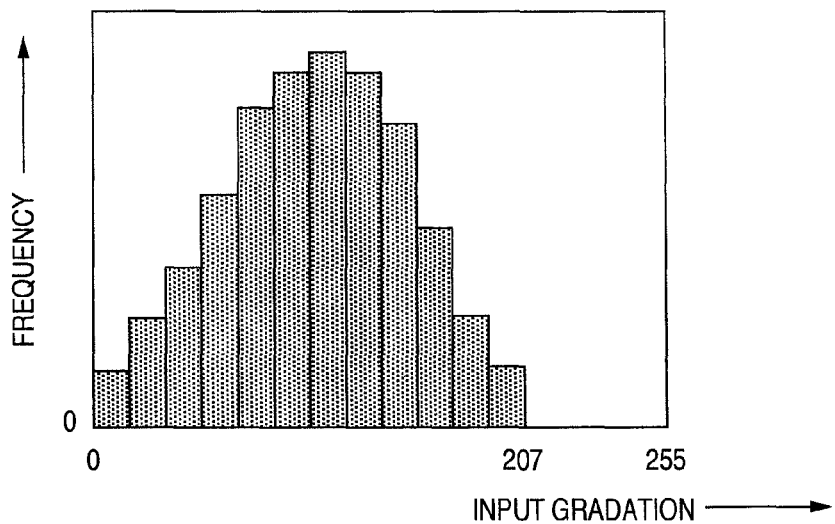
FIGS. 15A and 15B show an example of a luminance histogram and an example of correction characteristics, respectively.
Figure 15B:
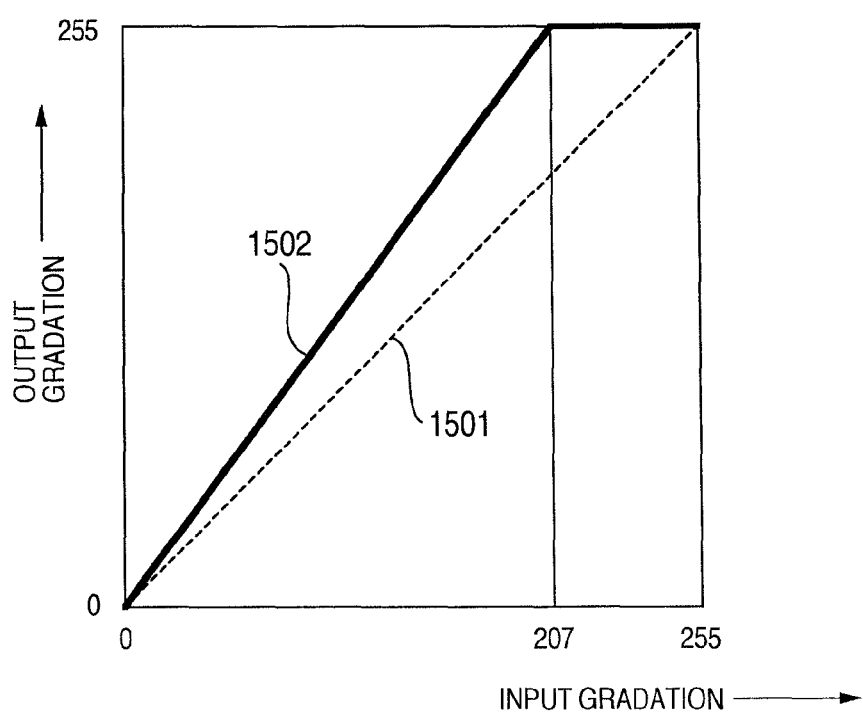

FIGS. 15A-15B are diagrams showing a correction example in the case where a video signal having no gradation on the white side is input. FIG. 15A is a luminance histogram of the input video signal. FIG. 15A shows an example in the case where a gradation range of 207 to 255 (Yhst13 to Yhst15) on the white side is not present, i.e., a video signal carrying a blackish video image is input. Applying to the processing flow shown in FIG. 13, it follows that blacklevel=0, whitelevel=207 to 255, and Ygain=1.22.

FIG. 15B shows an image of correction using the correction characteristics. A dotted line 1501 indicates characteristics of the output gradation relative to the input gradation in the case where the correction is not conducted. A solid line 1502 indicates correction characteristics. Since the output gradation is fixed to 255 in the range of 207 to 255 for which the gradation in the input video signal is not present, the gradient of the output gradation relative to the input gradation in the range of 0 to 207 is made great and expansion is conducted as far as 0 which is the output dynamic range limit. By using such correction characteristics, it is possible to make the contrast of the output gradation relative to the input gradation large and display an image which is easy to view in the gradation on the black side.

Figure 16A:
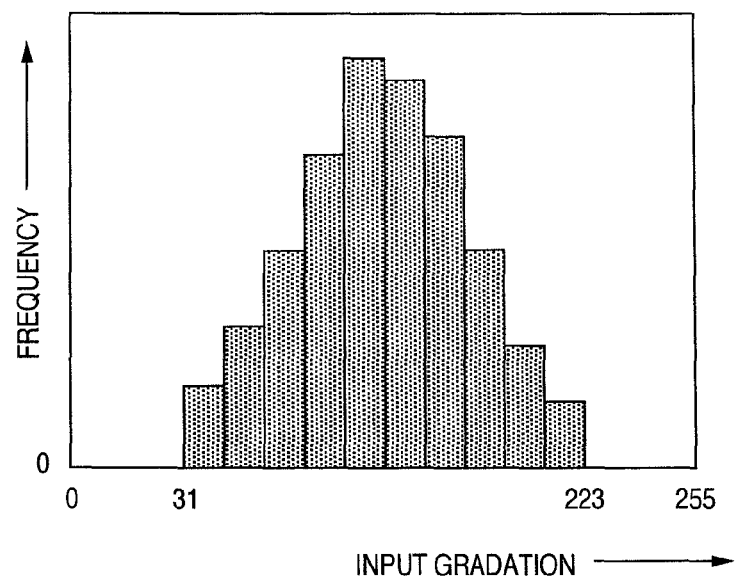
FIGS. 16A and 16B show an example of a luminance histogram and an example of correction characteristics, respectively.
Figure 16B:
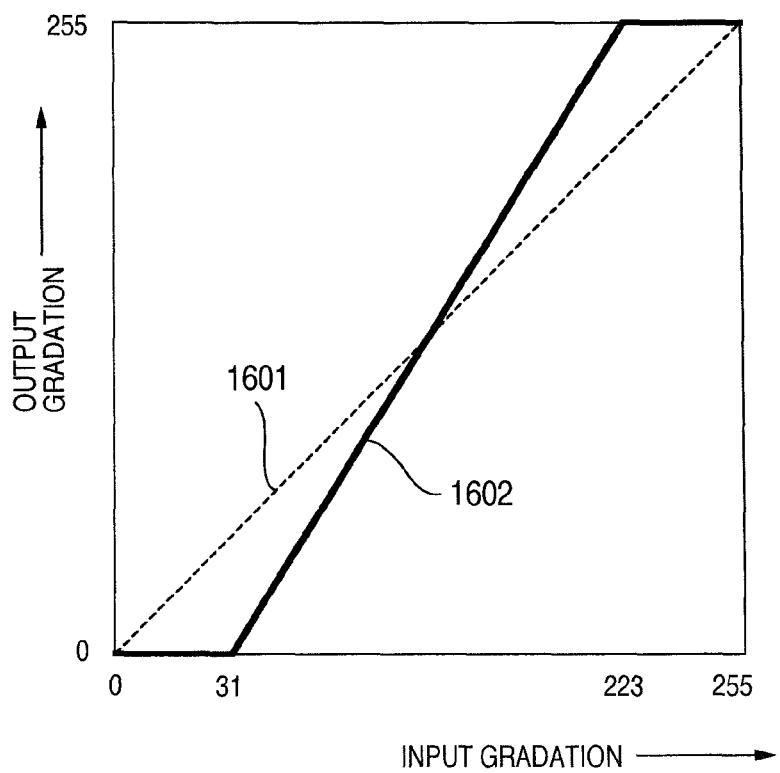

FIGS. 16A-16B are diagrams showing a correction example in the case where a video signal having no gradation on the black side and the white side is input. FIG. 16A is a luminance histogram of the input video signal. In this example, a gradation range of 0 to 31 (Yhst0 to Yhst1) on the black side and a gradation range of 223 to 255 (Yhst14 to Yhst15) on the white side are not present. Applying to the processing flow shown in FIG. 13, it follows that blacklevel=0 to 31, whitelevel=223 to 255, and Ygain=1.33.

FIG. 16B shows an image of correction using the correction characteristics. A dotted line 1601 indicates characteristics of the output gradation relative to the input gradation in the case where the correction is not conducted. A solid line 1602 indicates correction characteristics. Since the output gradation is fixed to 0 and 255 respectively in the range of 0 to 31 and 223 to 255 for which the gradation in the input video signal is not present, the gradient of the output gradation relative to the input gradation in the range of 31 to 223 is made great and expansion is conducted as far as 0 and 255 which are the output dynamic range limits. By using such correction characteristics, it is possible to make the contrast in the middle gradation large and display an image which is easy to view.

Figure 17:
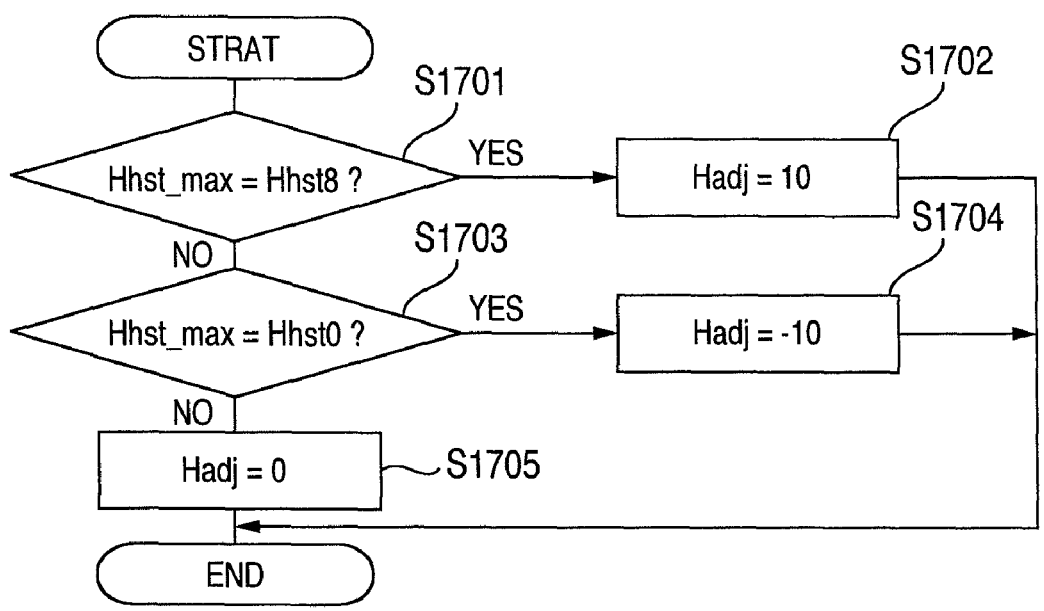
FIG. 17 shows a processing flow example of hue correction conducted in a modulator.

FIG. 17 shows a flow example of hue correction. In the present embodiment, the user previously selects a color desired to be especially vivid and emphasized from among colors such as yellow, red, magenta, blue, cyan and green. And color correction is conducted on the basis of the color selected by the user and a peak area Hhst max in the hue histogram. FIG. 17 shows correction processing in the case where, for example, blue is selected. First, a decision is made whether the peak Hhst max in the hue histogram corresponds to Hhst8 which is an area preceding an area Hhst9 corresponding to blue (S1701). If a result of the decision is yes, a hue adjustment value Hadj is set to 10 (S1702). If the result of the decision is no, a decision is made whether the peak area Hhst max in the hue histogram corresponds to Hhst10 which is located behind the area Hhst19 corresponding to blue (S1703). If a result of the decision is yes, the hue adjustment value Hadj is set to −10 (S1704). If the result of the decision is no, then Hadj is set to 0 and the processing is finished. As a result, the color set by the user can be emphasized.

In the example shown in FIG. 17, correction is conducted on the basis of the color set previously by the user. However, this is not restrictive. For example, it is possible to detect a peak area in the hue histogram and correct colors in areas before and after the peak area to the color of the peak area. In the case where a large quantity of components near the blue color are included as in a video image of the beach, therefore, it is possible to adjust the hue to the blue side and display a video image with blue emphasized.

Figure 18:
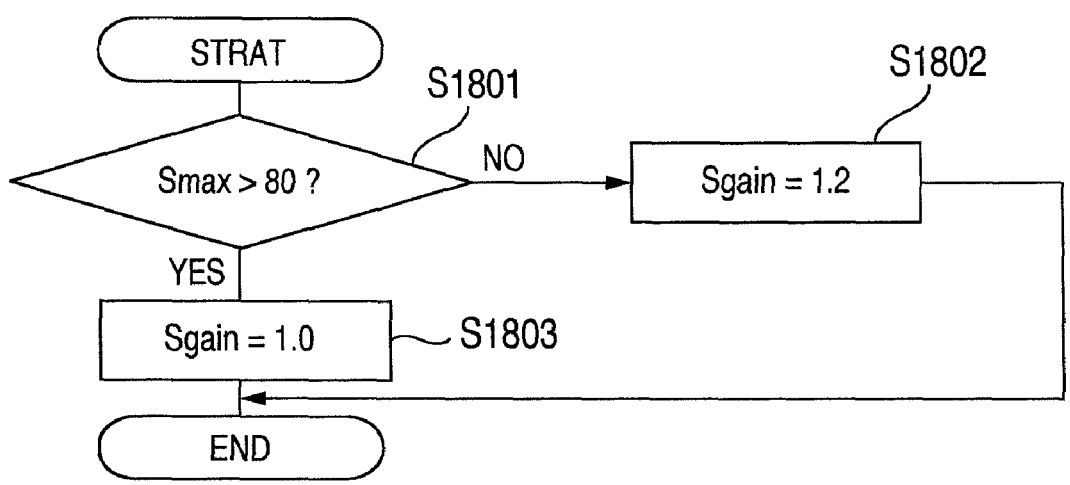
FIG. 18 shows a processing flow example of saturation correction conducted in a modulator.

FIG. 18 shows a flow example of saturation correction. A decision is made whether the maximum level of the saturation is greater than 80 (S1801). If a result of the decision is no, the saturation gain Sgain is set to 1.2 (S1802). If the result of the decision is yes, Sgain is set to 1.0 (S1803) and the processing is finished. When the maximum saturation is equal to a certain determinate value or less, therefore, it is possible to emphasize the saturation gain and conduct display with more vivid colors. Although in the example shown in FIG. 18 correction is conducted when the maximum saturation is equal to a determinate value or less, this is not restrictive. When the maximum saturation is equal to a determinate value or less, the gain may be lowered in order to avoid occurrence of color collapse due to saturation.

It is possible to view a favorable image having clear contrasts while holding down the power consumption by detecting a scene change and conducting the signal modulation as heretofore described.

The time when the modulator 152 conducts modulation on the input video signal may be immediately after an order is issued from the CPU 7 or may be after a definite time or a definite number of frames have elapsed. Or the modulation may be conducted transitionally so as to cause gradual convergence to desired correction characteristics. If the CPU 7 judges the compression factor to be high on the basis of header information of an image file before decoding or judges the receiving state to be poor on the basis of the bit error rate or the like acquired from the TV tuner 13, then the possibility of occurrence of block noise is high, and consequently the degree of correction may be weakened to prevent the block noise from being emphasized. On the contrary, if the CPU 7 judges the compression factor to be low, then the possibility of occurrence of block noise is low, and consequently the degree of correction may be strengthened to conduct display with a higher picture quality. For example, if the compression rate is high, then the degree of correction is weakened by changing the limit value of the blacklevel to 23, changing the hue adjustment value Hadj to 5, or changing the saturation gain Sgain to 1.1.

In the present embodiment, the example in the case where the above-described picture quality enhancement processing is implemented by the picture quality enhancement circuit 15 has been described. If the processing capability of the CPU 7 has a margin, however, a part or the whole of the picture quality enhancement processing may be conducted in a software form in the CPU 7 without using the picture quality enhancement circuit 15.

In the present embodiment, the example in the case where the scene change detector 1552 is provided in the I/F unit 155 and the CPU 7 conducts generation and update processing of correction data in response to the INT 141 supplied from the scene change detector 1552 has been described. Alternatively, the CPU 7 may conduct generation and update processing when a specific picture such as an I picture or an IDR (Instantaneous Decoding Refresh) picture has been generated when an encoded image is decoded.

(Second Embodiment)

Figure 19:
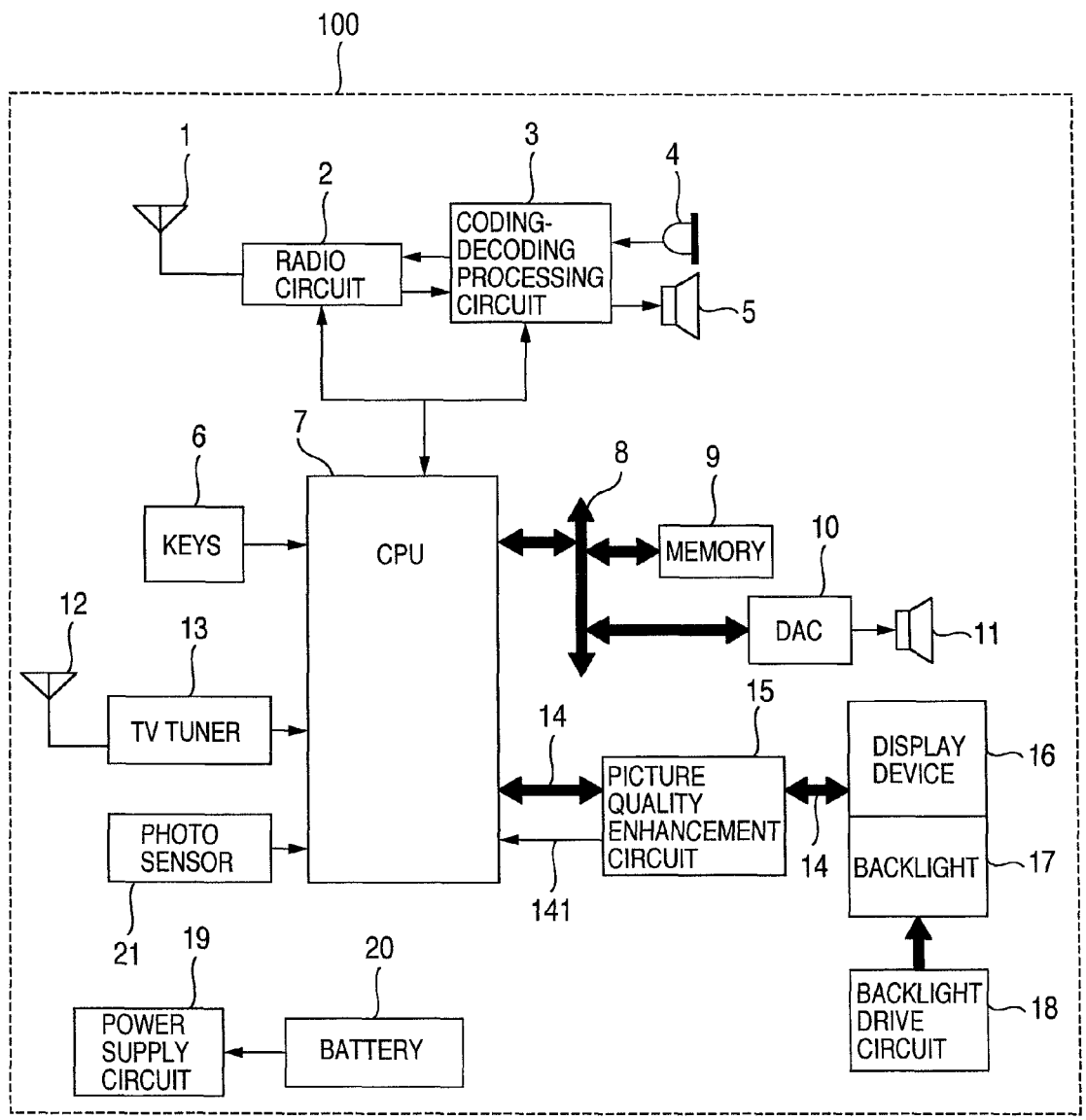
FIG. 19 is a block diagram showing a configuration example of a portable telephone.

FIG. 19 is a block diagram showing another configuration example of portable telephone. The same components as those shown in FIG. 1 are denoted by like reference numerals, and description of them will be omitted. Since the portable telephone is used in various places such as indoors and outdoors, the illuminance in surroundings differs according to the use situation. In a bright environment such as outdoors in a clear day, light in surroundings is incident on the display device 16. This results in a problem that the gradation on the low luminance side, i.e., the black side of the displayed image becomes hard to discriminate. The portable telephone shown in FIG. 19 includes a photo sensor 21, and superposes correction data based on illuminance besides correction based on characteristic data of the input signal.

Figures 20, 21:
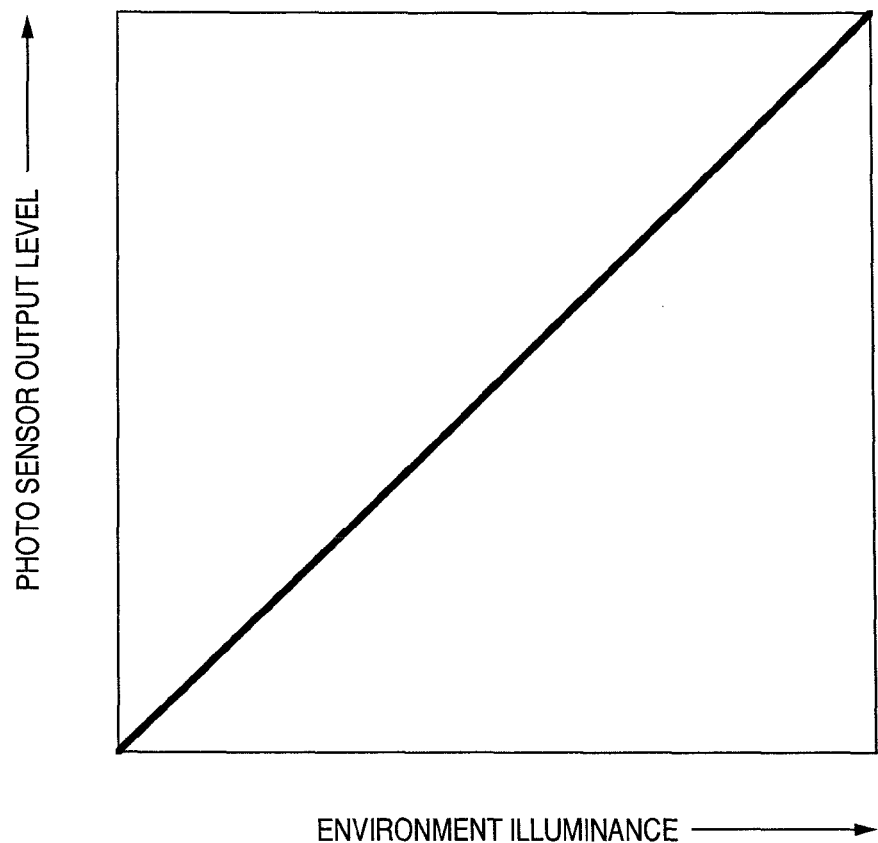
FIG. 20 is a diagram showing an example of input-output characteristic of a photo sensor.
FIG. 21 shows an example of correction data.

The photo sensor 21 includes a phototransistor and a photodiode. An example of output characteristics of the photo sensor 21 is shown in FIG. 20. The abscissa indicates environment illuminance, and the ordinate indicates an output level of the photo sensor. As the environment illuminance increases, the output level of the photo sensor 21 also becomes high. In the present example, the photo sensor 21 is provided as means used to detect illuminance. Alternatively, the illuminance may be detected by using an output signal of a CMOS camera or a CCD camera.

Correction data used to correct the output gradation when the illuminance detected by the photo sensor 21 has become at least a predetermined value are stored in the memory 9. FIG. 21 shows an example of correction data. A correction value is set every gradation area Yhst. In the present example, the output gradation on the black side is corrected so as to make it easy to discriminate the gradation on the black side. In the present example, one kind of correction data is provided for the case where the illuminance is at least a predetermined value. Alternatively, a plurality of kinds of correction data differing in correction values and gradation ranges to be corrected may be provided. The correction data of the kinds may be stored in the memory 9. Alternatively, for example, it is also possible to use the correction data shown in FIG. 21 as reference data and multiply the reference data by a coefficient depending upon the illuminance to calculate correction data.

Figure 22:
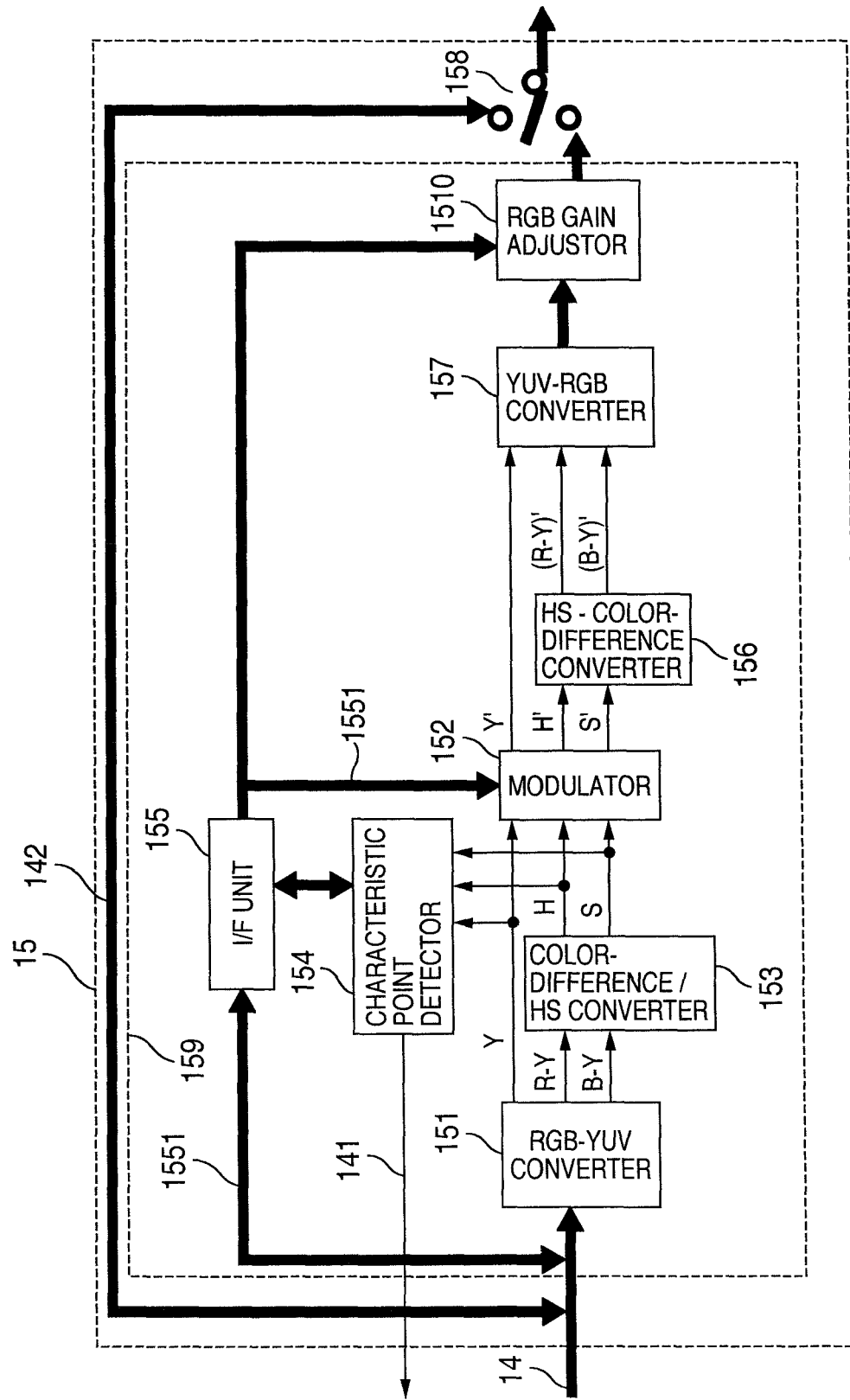
FIG. 22 is a block diagram showing a configuration example of a picture quality enhancement circuit.

FIG. 22 shows an internal block diagram of the picture quality enhancement circuit 15. An RGB gain adjuster 1510 is added to the picture quality enhancement circuit shown in FIG. 2. The same components as those shown in FIG. 2 are denoted by like reference numerals, and description of them will be omitted.

The illuminance detected by the illuminance sensor 7 is input to the CPU 7. If the illuminance is at least a predetermined value, the CPU 7 outputs a control signal to order the RGB gain adjuster 1510 to correct the output gradation. Under the control of the CPU 7, the RGB gain adjuster 1510 reads out correction data from the memory 9 through the I/F unit 155 and adjusts the gain for the video signal. Hereafter, superposition operation of correction data based on illuminance conducted by the RGB gain adjuster 1510 will be described with reference to FIGS. 23A-23D.

FIG. 23A shows characteristics of the output gradation relative to the input gradation of the luminance signal in the case where the blacklevel=0 to 47, whitelevel=255 and correction is not conducted by the modulator 152. If the illuminance is at least a predetermined value, the output gradation relative to the input gradation is corrected as shown in FIG. 23B. Specifically, the RGB gain adjuster 1510 conducts correction so as to emphasize the output gradation on the black side. In a bright environment as well, therefore, an image which can be viewed easily can be displayed. On the other hand, if the illuminance is less than a predetermined value, then the RGB gain adjuster 1510 does not conduct correction and the output gradation relative to the input gradation remains that shown in FIG. 23A.

FIG. 23C shows a state in which the blacklevel=0 to 47, whitelevel=255 and the modulator 152 has corrected the output gradation relative to the input gradation in the range of 47 to 255. If the illuminance is at least a predetermined value, the RGB gain adjuster 1510 corrects the output gradation relative to the input gradation by using correction data read out from the memory 9 as shown in FIG. 23D. In the present example, the RGB gain adjuster 1510 is controlled so as not to conduct correction with respect to the range of blacklevel=0 to 47. If the correction quantity in the RGB gain adjuster 1510 is equal to a determinate value or less, however, it matters little even if gain modulation is conducted.

In the example heretofore described, the gradation on the black side is emphasized according to the illuminance. However, this is not restrictive. Correction may be conducted according to the color of light in the surroundings. For example, if the color of sunlight is reddish as in the evening sun, there is a problem that the color of the display image is made reddish under the influence of the sunlight.

In order to solve this problem, the photo sensor 21 includes three independent RGB (Red, Green and Blue) detection elements, and the CPU 7 calculates ratios among those detection elements. As a result, modulation is conducted according to the color in addition to the strength of sunlight.

The CPU 7 calculates ratios among RGB output colors of the photo sensor 21. If any of the RGB components is large in quantity, the CPU 7 controls the RGB gain adjuster 1510 to lower the correction value for the color that is much in component. For example, if the CPU 7 detects that the light contains much R components as in the case where the light in the surroundings is given by the evening sun or an incandescent electric lamp, the CPU 7 orders the RGB gain adjuster 1510 to decrease the correction data for R as compared with G and B.

Figure 24A:
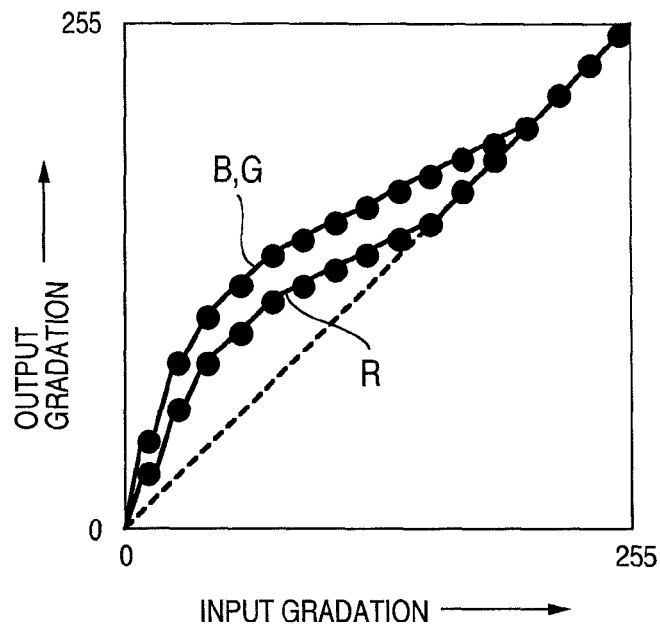
FIGS. 24A and 24B are diagrams showing characteristic examples of input gradation versus output gradation in luminance signal.
Figure 24B:
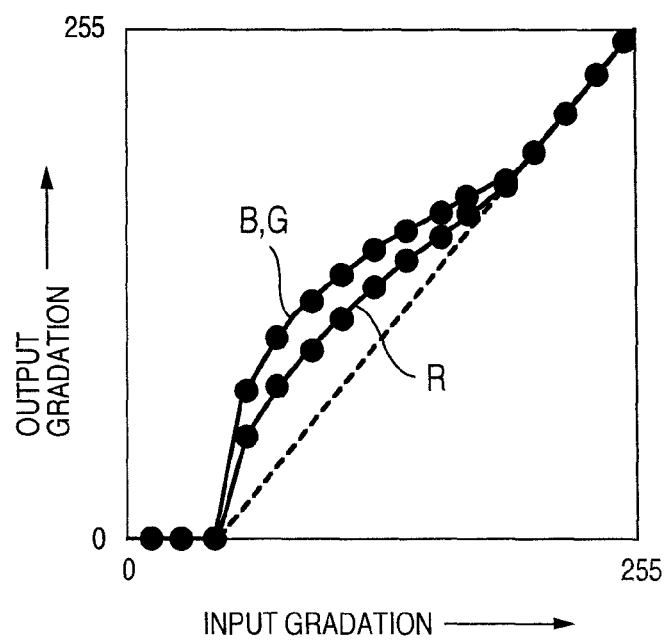

FIG. 24A shows a state in which the output gradation relative to the input gradation of the luminance signal is not corrected by the modulator 152, but it is corrected by the RGB gain adjuster 1510. FIG. 24B shows a state in which the output gradation relative to the input gradation in the range of 47 to 255 is corrected by the modulator 152, and correction is conducted by the RGB gain adjuster 1510. In each of FIGS. 24A and 24B, correction is conducted to lower the gain for R as compared with G and B. As a result, it is possible to keep ratios among R, G, and B on the display device 16 at desired ratios and conduct favorable display. Here, the example of the case where the sunlight contains much R component has been described. Also in the case where the sunlight contains much G or R component, however, correction can be conducted in the same way.

In addition to the modulation of the input signal, the color of the backlight 17 may be modulated according to the color of light in the surroundings.

Figure 25:
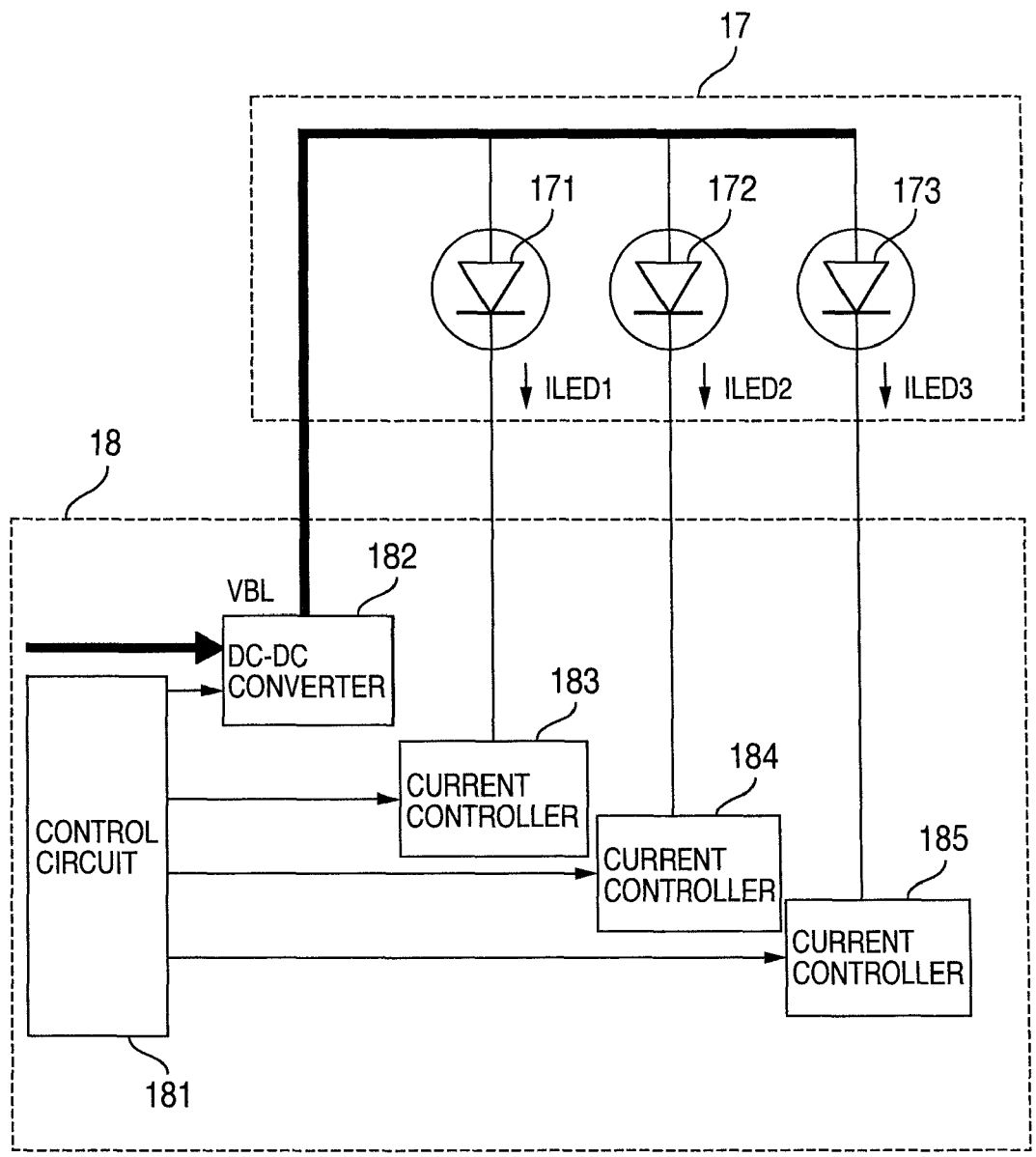
FIG. 25 is a block diagram showing a configuration example of backlight and a backlight drive circuit.

FIG. 25 shows a configuration example of the backlight 17 and the backlight drive circuit 18. Light source elements (LEDs) 171 to 173 are an R-LED, a G-LED and a B-LED, respectively. Current controllers 183 to 185 individually control currents of the LED 171 to LED 173, respectively, on the basis of an order given by a control circuit 181. A DC-DC converter 182 steps up or steps down the voltage supplied from the battery 20 to drive the LED 171 to LED 173. Based on the order given by the CPU 7, the control circuit 181 sets current values of the current controllers 183 to 185. In general, the luminosity of each of the LED 171 to LED 173 is proportional to a current flowing between its anode and cathode. Therefore, the luminosity can be individually controlled from the CPU 7 by controlling the currents flowing through the LED 171 to LED 173 via the control circuit 181 and the current controllers 183 to 185.

Figure 26:
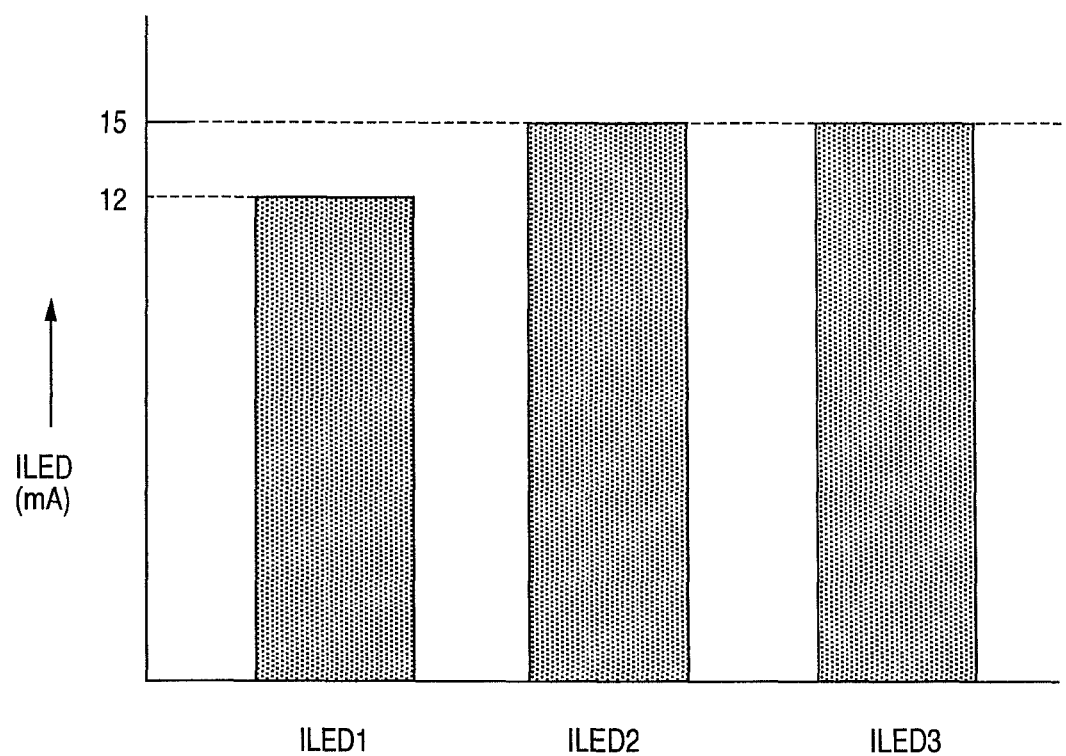
FIG. 26 is a diagram showing an example of LED current values.

FIG. 26 shows an example of control exerted upon the LED 171 to LED 173 when a large quantity of R component is contained in light in the surroundings. The ordinate indicates currents let flow through the LED 171 to LED 173. If a large quantity of R component is contained, then control is exercised so as to reduce the current flowing through the R-LED 171 as compared with the LED 172 and the LED 173. By thus exercising control, it is possible to prevent the color of the display image from being changed by the color of light in the surroundings.

The example of the case where a large quantity of R component is contained in the sunlight has been described. If a large quantity of G is contained in the sunlight, however, then the current flowing through the green-colored LED 172 should be made less than the currents flowing through R and B. If a large quantity of B is contained in the sunlight, then the current flowing through the B-LED 173 should be made less than the currents flowing through R and G.

In the present example, the case where one R-LED 171, one G-LED 172 and one B-LED 173 are used as light source elements has been described. However, this is not restrictive. The present control method may be applied to the case where a backlight of LED array type including a plurality of minute LEDs respectively corresponding to the colors or a self-luminous characteristic display such as an organic electroluminescence (EL) display.

Heretofore, the example of the case where correction is conducted on the colors of the sunlight by using the backlight 17 has been described. If the sunlight illuminance is high, however, it is possible to view a favorable image by increasing the currents flowing through the LED 171 to LED 173 at the same ratio. On the contrary, if the sunlight illuminance is low, it is possible to reduce the power dissipation by reducing the currents flowing through the LED 171 to LED 173 at the same ratio.

In the foregoing description, a portable terminal apparatus such as a portable telephone has been taken as an example. However, application of the present invention is not restricted to portable terminal apparatuses. The present invention may be applied to any apparatus as long as the apparatus is a video processing apparatus by which a video image can be viewed. For example, the apparatus may be a terminal apparatus that does not have a communication function. Furthermore, since power consumption for the high picture quality display can be made low, the present invention is effective especially for a portable terminal that operates with a battery. However, the present invention may be applied to a stationary terminal apparatus that operates with power supplied from a home outlet.

(Third Embodiment)

When converting contents having an aspect ratio of, for example, 4:3 to a video signal having an aspect ratio of 16:9 and corresponding to an image which is long sideways, for example, in a broadcasting station, pattern portions such as patterned wallpaper areas or single-colored no-picture area are added to the left and right of the contents sometimes. It is desirable that the pattern portions are stationary in order to make the video image easy to see. However, a part of a mark or the like may be changed.

If the video signal with the pattern portions added is subjected to picture quality correction by taking a frame as the unit or a scene as the unit, there is a possibility that the video image will become rather indecent because the luminance or color of the pattern portions changes according to the contents of the video signal. In the present embodiment, an example of a portable telephone including a detector to detect whether there is a pattern portion and having a function of stopping the picture quality correction when a pattern portion is detected will be described.

Figure 27:
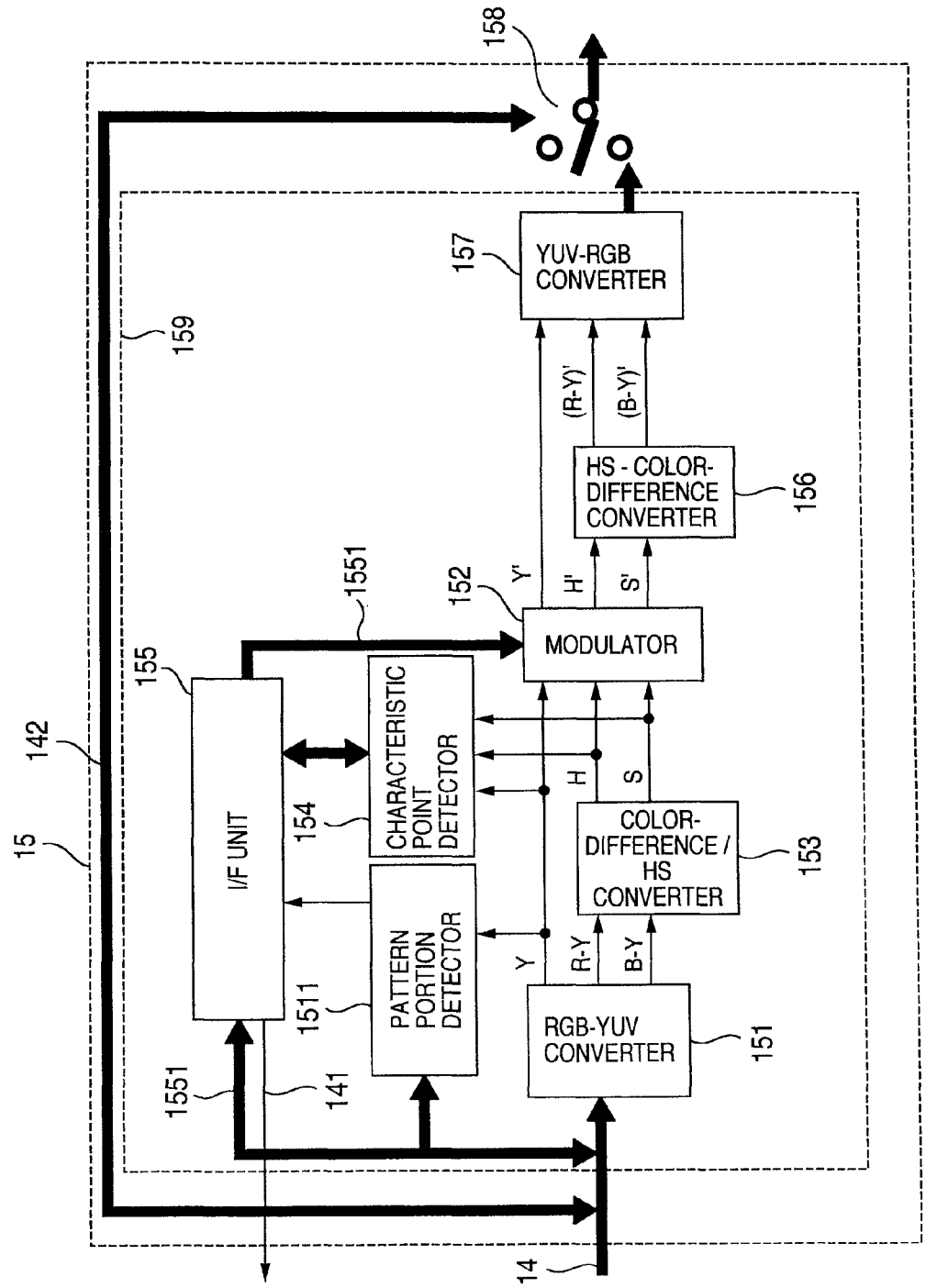
FIG. 27 is a block diagram showing a configuration example of a picture quality enhancement circuit.

FIG. 27 is a block diagram showing another configuration example of the picture quality enhancement circuit in the portable telephone. A pattern portion detector 1511 is added to the picture quality enhancement circuit shown in FIG. 2 to detect pattern portions inserted on the left and right of an image. The same components as those shown in FIG. 2 are denoted by like reference numerals, and description of them will be omitted.

Figure 28:
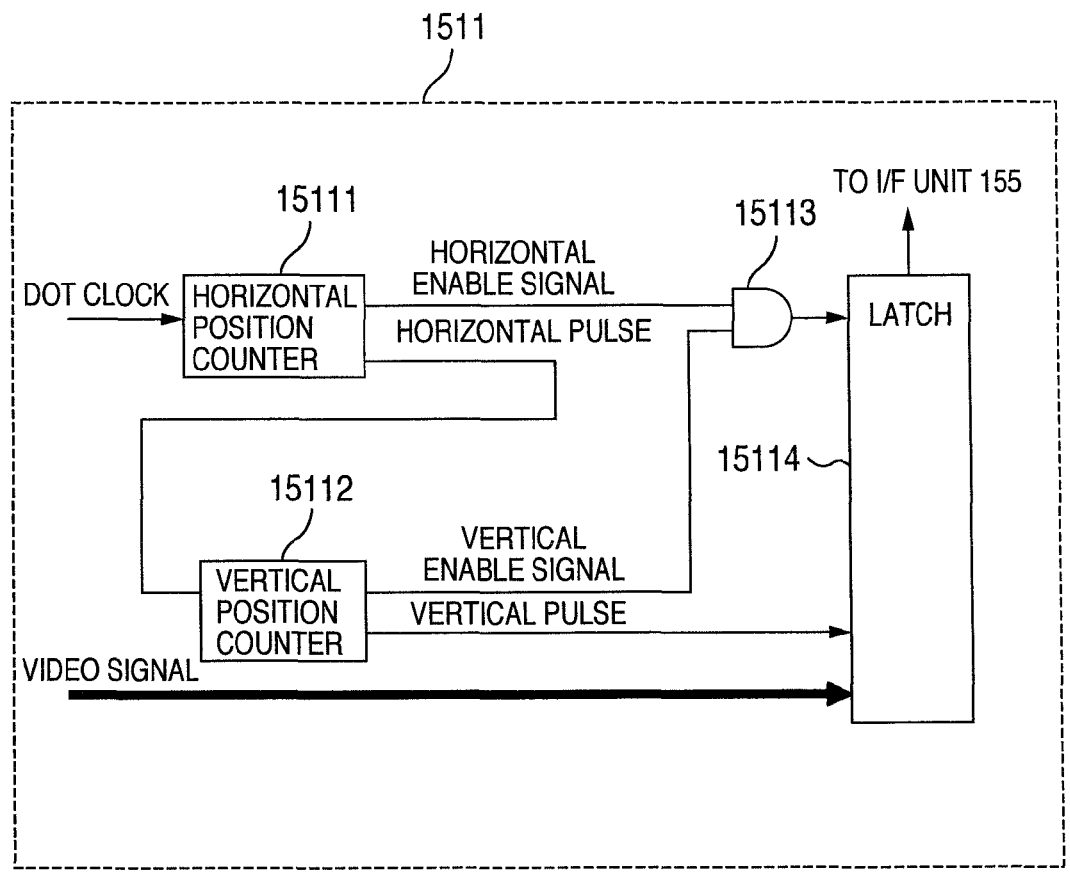
FIG. 28 is a block diagram showing a configuration example of a pattern portion detection circuit.
Figure 32A:
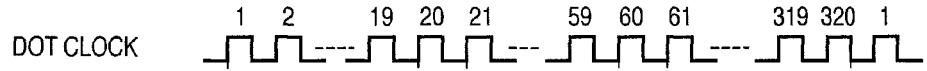
FIGS. 32A to 32D show an example of internal waveforms of a pattern portion detection circuit.
Figure 32B:
Figure 32C:
Figure 32D:
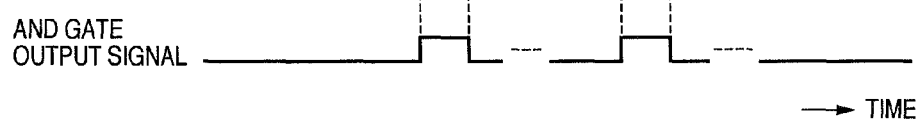

FIG. 28 shows a configuration example of the pattern portion detector 1511. A horizontal position counter 15111 counts dot clock pulses in an input video signal. When the count has reached a predetermined value, the horizontal position counter 15111 outputs a horizontal enable signal. When the count has coincided with the number of pixels in the horizontal direction of the display device 16, the horizontal position counter 15111 outputs a horizontal pulse and clears the count. A vertical position counter 15112 counts the horizontal pulses output from the horizontal position counter 15111. When the count has reached a predetermined value, the vertical position counter 15112 outputs a vertical enable signal. When the count has coincided with the number of pixels in the vertical direction of the display device 16, the vertical position counter 15112 outputs a vertical pulse and clears the count.

An AND gate 15113 outputs a logical product of the horizontal enable signal output from the horizontal position counter 15111 and the vertical enable signal output from the vertical position counter 15112. A latch circuit 15114 takes in and retains a value of the luminance signal Y output from the RGB-YUV converter 151, on the basis of the output of the AND gate 15113.

FIG. 29 shows positions of pattern portion detection points on the display device 16. As for the number of pixels on the display device 16, it is supposed that, for example, there are 320 dots in the horizontal direction and 180 dots in the vertical direction. It is also supposed that the aspect ratio is 16:9. An image obtained by inserting pattern portions on the left and right of the contents having an aspect ratio of 4:3 is displayed on the display device 16. If the number of dots of the 4:3 contents in the vertical direction is set equal to 180 so as to make it coincide with the number of pixels on the display device 16, then the number of pixels in the horizontal direction becomes 240 dots. Therefore, pattern portions each having 40 dots are displayed on the left and right. Detection points are disposed in three places P11, P12 and P13 in a pattern portion display area and three places P21, P22 and P23 in a contents display area. In other words, the detection points are disposed in a total of six places.

Supposing that the top left position on the display device 16 is the origin A having coordinates (x,y)=(0,0), coordinates of the detection points are (20,20) for P11, (60,20) for P21, (20,90) for P12, (60,90) for P22, (20,160) for P13, and (60, 160) for P23. In the present embodiment, the pattern portions are inserted on the left and right of a video image evenly and detection is conducted by using only the left side. However, this is not restrictive, but detection may be conducted by using only the right side, or detection may be conducted by using both the left and right sides. If contents that is longer sideways than 16:9 as in the CinemaScope size, there is a possibility that pattern portions will be inserted above and below the contents display area and consequently detection points may be disposed above and under the image. As for the number of detection points as well, it is sufficient that there is at least one detection point outside the contents display area. Or as many detection points as the number of pixels on the display device 16 or the number of pixels in the contents may be provided as in the frame memory.

An example of operation in the horizontal position counter 15111 will now be described with reference to FIGS. 30A-30C. In the horizontal position counter 15111, for example, 20 and 60 which are x coordinates of the detection points and 320 which is the number of pixels in the horizontal direction of the display device 16 are preset in order to generate the horizontal enable signal. As for the presetting, it may be conducted from the CPU 7, or the preset values may be fixed within the horizontal position counter 15111. The initial values are thus preset in the horizontal position counter 15111. As a result, the horizontal position counter 15111 counts dot clock pulses input thereto, and outputs the horizontal enable signal which assumes a high level at the preset 20th and 60th clock pulse. Furthermore, the horizontal position counter 15111 outputs the horizontal pulse which assumes a high level at the 320th clock pulse. When the horizontal position counter 15111 has output the horizontal pulse, it resets the count, resumes counting from "0", and repeats the operation of periodically outputting the horizontal enable signal and the horizontal pulse at the above-described timing.

An example of operation in the vertical position counter 15112 will now be described with reference to FIGS. 31A-31C. In the vertical position counter 15112, for example, 20, 90 and 160 which are y coordinates of the detection points and 180 which is the number of pixels in the vertical direction of the display device 16 are preset in order to generate the vertical enable signal. As for the presetting, it may be conducted from the CPU 7, or the preset values may be fixed within the vertical position counter 15112. The initial values are thus preset in the vertical position counter 15112. As a result, the vertical position counter 15112 counts horizontal pulses output from the horizontal position counter 15111, and outputs the vertical enable signal which assumes a high level at the preset 20th, 90th and 160th count. Furthermore, the vertical position counter 15112 outputs the vertical pulse which assumes a high level at the 180th clock pulse. When the vertical position counter 15112 has output the vertical pulse, it resets the count, resumes counting from "0", and repeats the operation of periodically outputting the vertical enable signal and the vertical pulse at the above-described timing.

An example of input and output waveforms of the AND gate 15113 is shown in FIGS. 32A-32D. FIGS. 32A-32D show an example of the case where the count in the vertical position counter 15112 has reached 20. Only when both the horizontal enable signal and the vertical enable signal are at the high level, the AND gate 15113 outputs the high level. Therefore, the output of the AND gate 15113 assumes the high level at the 20th clock pulse and the 60th clock pulse of the horizontal position counter 15111 of the 20th count, 90th count and 160th count in the vertical position counter 15112.

The latch circuit 15114 takes in the value of the luminance signal Y at timing of the AND gate 15113 assuming the high level, and maintains it over one frame period. As a result, the value of the luminance signal at each detection point can be acquired.

A flow of decision concerning the pattern portions in the I/F unit 155 will now be described with reference to FIG. 33. A decision is made whether a vertical pulse has been received (S3301). Unless received, the I/F unit 155 waits for reception of a vertical pulse. If received, the I/F unit 155 proceeds to S3302. The I/F unit 155 acquires the value of the luminance signal Y at each detection point from the pattern portion detector 1511 (S3302) and finds a difference from the preceding frame at each detection point (S3303).

With respect to the detection points P11, P12 and P13 in the pattern portion display region when the 4:3 video image is displayed, a decision is made whether the difference (ΔP11, ΔP12, ΔP13) from the preceding frame is "0" (S3304). When this difference is not "0", the I/F unit 155 judges that a pattern portion is not contained and proceeds to S3308.

On the other hand, if the difference is "0", the I/F unit 155 judges that there is a possibility that a pattern portion will be contained, and proceeds to S3305. Even if the difference at P11, P12 and P13 is "0", there is a possibility that the contents will have a motion only in the central part. With respect to the detection points P21, P22 and P23 in the contents display region when the 4:3 video image is displayed, a decision is made whether the difference (ΔP21, ΔP22, ΔP23) from the preceding frame is "0" in order to discriminate such contents at S3305. When this difference is "0", the I/F unit 155 judges that the contents have a motion only in the central part, and proceeds to S3308.

When the frame difference at P21, P22 and P23 is not "0", the I/F unit 155 judges that a pattern portion is contained, and sets a flag provided in a part of a register to indicate whether there is a pattern portion to "1" (there is a pattern portion) (S3306). And the I/F unit 155 issues an interrupt to the CPU 7, requests register reading, and notifies the CPU 7 that the contents have a pattern portion (S3307). At S3308, the value of the luminance signal Y at each detection point is stored as preceding frame data.

Figure 34:
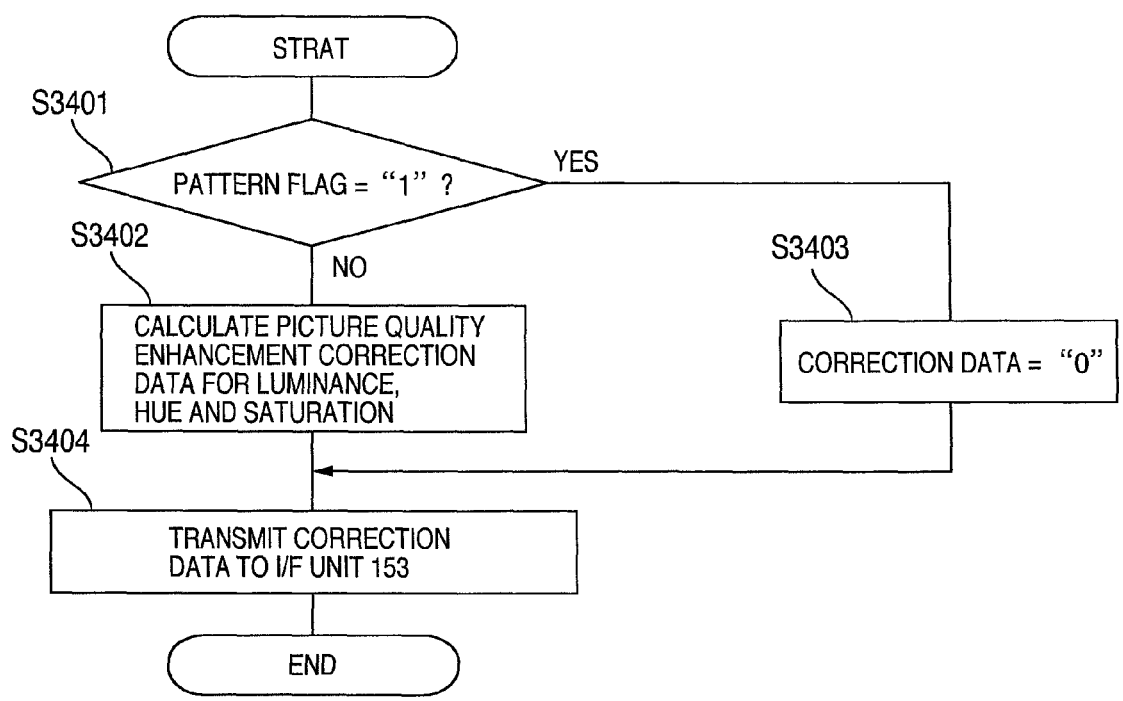
FIG. 34 is a flow diagram showing an example of processing conducted in a CPU.

FIG. 34 shows a processing flow in the CPU 7. Correction characteristics update processing in the CPU 7 is executed by receiving the interrupt 141 from the I/F unit 155. When the pattern flag is "0" at S3401, i.e., when there is no pattern portion, the CPU 7 calculates correction data to conduct the picture quality enhancement processing by using the method described in the first embodiment or the second embodiment at S3402, and transmits the correction data to the I/F unit 153 (S3404). When the pattern flag is "1" at S3401, i.e., when there is a pattern portion, the CPU 7 sets correction data="0" at S3403, and transmits the correction data to the I/F unit 153 (S3404).

A concrete example of pattern portion detection in the I/F unit 155 will now be described with reference to FIGS. 35A-35C and 36A-36C.

FIGS. 35A to 35C show an example of the case where contents having no pattern portions are input. FIG. 35A shows a video image of a preceding frame. FIG. 35B shows a video image of the next frame. FIG. 35C shows values of the luminance signal Y in the preceding frame and the subsequent frame at each detection point and their differences.

It is supposed in FIG. 35A that, for example, the value of the luminance signal Y in the video signal is 100 at sun 351, 80 at sky 352, 50 at a large mountain 353, and 40 at a small mountain. As for the value of the luminance signal Y in the preceding frame at each detection point, P11:100, P12:80, P13:50, P21:80, P22:50 and P23:40 are retained as indicated in a column of frame 1 in FIG. 35C.

Figure 33:
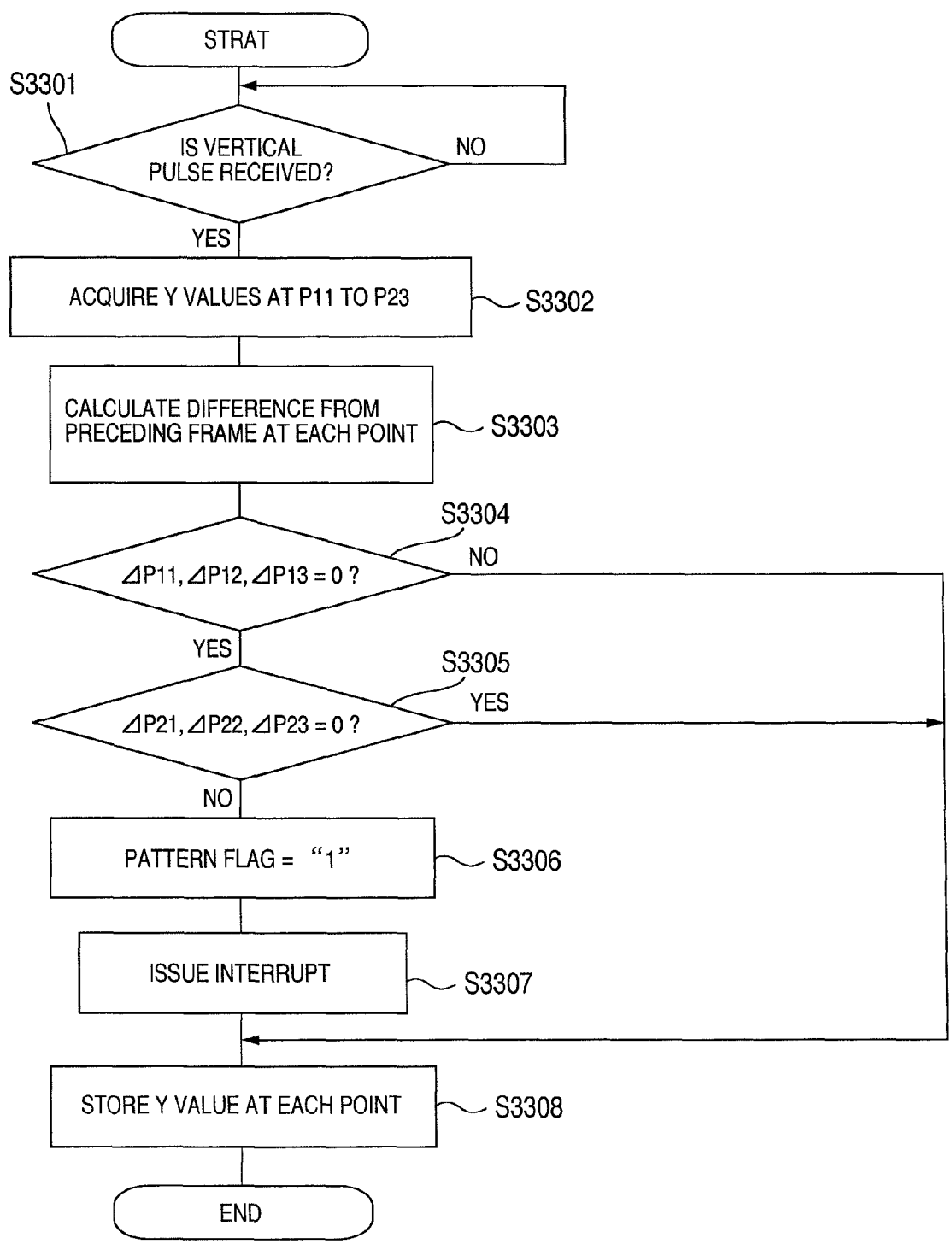
FIG. 33 is a flow diagram showing an example of processing conducted in an I/F circuit.

If a video signal as represented by FIG. 35B is input, the I/F unit 155 acquires the value of the luminance signal Y at each detection point shown in FIG. 35B after detection of the vertical pulse, according to the flow shown in FIG. 33. For example, P11:80, P12:80, P13:80, P21:100, P22:80 and P23:50 are acquired as indicated in a column of frame 2 in FIG. 35C. At S3303, the I/F unit 155 calculates a difference between the frame 1 and the frame 2. As a result, $\Delta$P11:−20, $\Delta$P12:0, $\Delta$P13:30, $\Delta$P21:20, $\Delta$P22:30 and $\Delta$P23:10 are obtained as indicated in a column of frame difference in FIG. 35C. Since $\Delta$P11 and $\Delta$P13 are not "0" at S3304, the I/F unit 155 proceeds to S3308, stores the Y values at respective detection points as values of the preceding frames, and finishes the processing. Therefore, it is not judged that there is a pattern portion.

FIGS. 36A to 36C show an example of the case where contents having pattern portions are input. FIG. 36A shows a video image of a preceding frame. As shown in FIG. 36A, pattern portions are inserted on the left and right of 4:3 contents. If such a video signal is input, P11:23, P12:22, P13:25, P21:100, P22:50 and P23:40 are retained as the values of the luminance signal Y in the preceding frame as indicated in a column of frame 1 in FIG. 36C.

The I/F unit 155 acquires the value of the luminance signal Y at each detection point shown in FIG. 36B according to the flow shown in FIG. 33. Results of the acquisition become, for example, P11:23, P12:22, P13:25, P21:80, P22:80 and P23:50 as indicated in a column of frame 2 in FIG. 36C (S3302). The difference between the frame 1 and the frame 2 becomes $\Delta$P11:0, $\Delta$P12:0, $\Delta$P13:0, $\Delta$P21:−10, $\Delta$P22:30 and $\Delta$P23:10 as shown in FIG. 36C (S3303). Since $\Delta$P11, $\Delta$P12 and $\Delta$P13 are "0" at S3304, the I/F unit 155 proceeds to S3305, where a decision is made whether $\Delta$P21, $\Delta$P22 and $\Delta$P23 are "0". In the present example, $\Delta$P21, $\Delta$P22 and $\Delta$P23 are not "0". Therefore, the I/F unit 155 proceeds to S3306, and sets the pattern portion flag="1" in the register. At S3307, the I/F unit 155 issues an interrupt to the CPU 7, requests register reading, and notifies the CPU 7 that the contents have pattern portions. At S3308, the I/F unit 155 stores the values of the luminance signal Y at respective detection points, and finishes the processing.

The CPU 7 recognizes that the contents have pattern portions by detecting the pattern portion flag="1", and writes correction characteristics which output the input signal as it is, into the I/F unit 155. As a result, the picture quality enhancement processing at the time of display of contents having pattern portions is stopped.

As heretofore described, it is detected whether the video signal includes a pattern portion. If a pattern portion is contained, the picture quality enhancement processing for the video signal is stopped. As a result, flicker caused in the pattern portions by a change in luminance and color is prevented, and it can be made easy to view the contents.

In the present embodiment, the case where the picture quality enhancement processing is stopped in response to the detection of pattern portions has been described. However, this is not restrictive. Update of the correction data may be stopped in response to the detection of the pattern portion. By stopping the update of the correction data, it is possible to prevent the luminance and color of the pattern portions from being changed.

The example in which the image having pattern portions is judged by using the difference in the luminance signal Y between two consecutive frames has been described. However, this is not restrictive. Alternatively, at least three consecutive frames may also be used. Or a decision may be made by using frames thinned at definite intervals and extracted.

(Fourth Embodiment)

If the pattern portions are formed of single color of black, correction causes a less change in the pattern portions as compared with the case where the pattern portions are formed of patterns or a single chromatic color. When it is detected that pattern portions have been added to the left and right of contents, it is detected in the present embodiment whether the pattern portions are black no-picture areas. If the pattern portions are black no-picture areas, then the video signal is corrected. This case will now be described. By the way, in the present embodiment, a portion that is contained in the pattern portions and that is not a black no-picture area portion is used as a wallpaper area portion.

Figure 37:
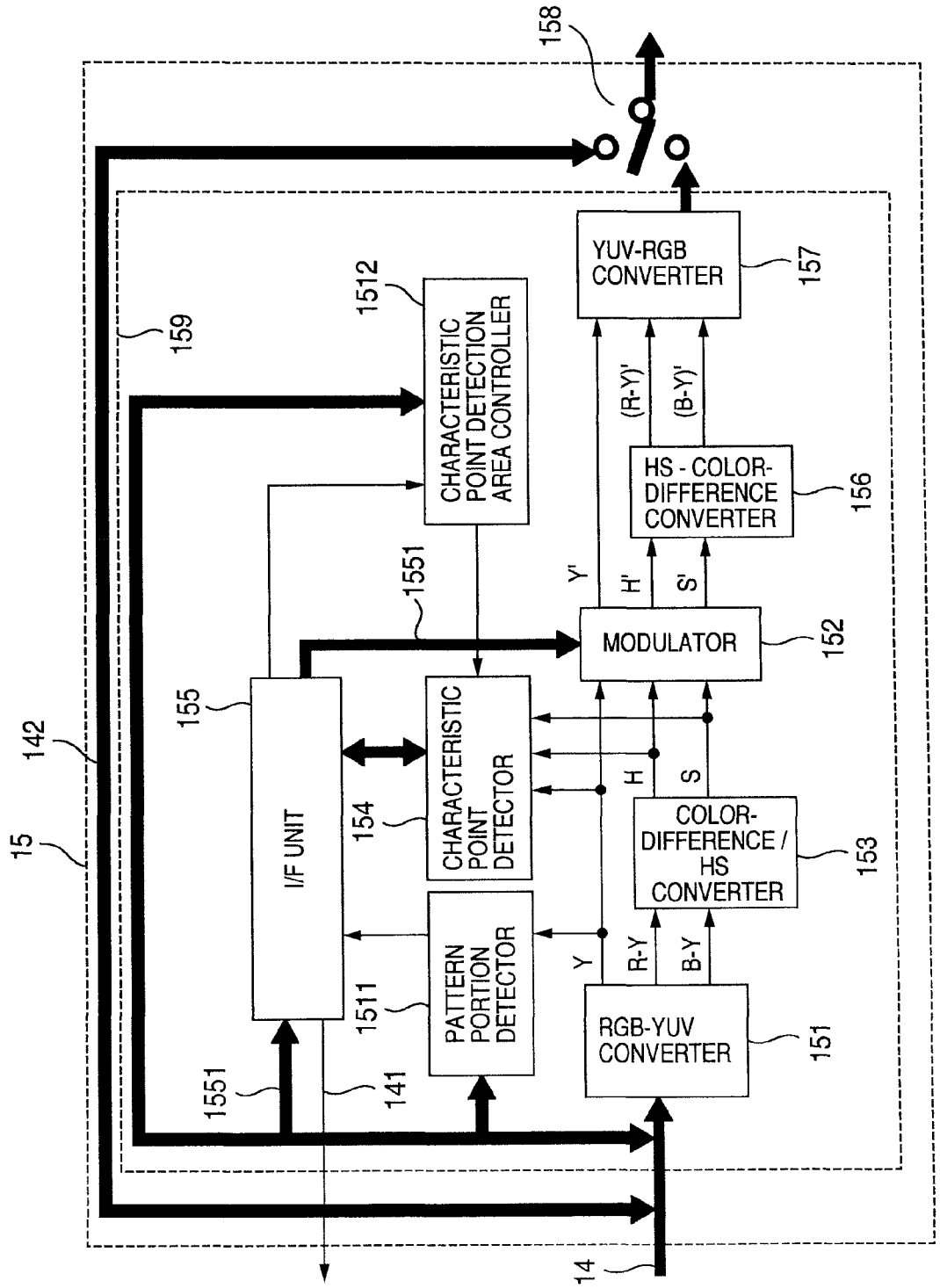
FIG. 37 is a block diagram showing a configuration example of a picture quality enhancement circuit.

FIG. 37 is a block diagram showing another configuration example of the picture quality enhancement circuit in the portable telephone. The picture quality enhancement circuit differs from the picture quality enhancement circuit shown in FIG. 27 that a characteristic point detection area controller 1512 is provided.

Figure 38:
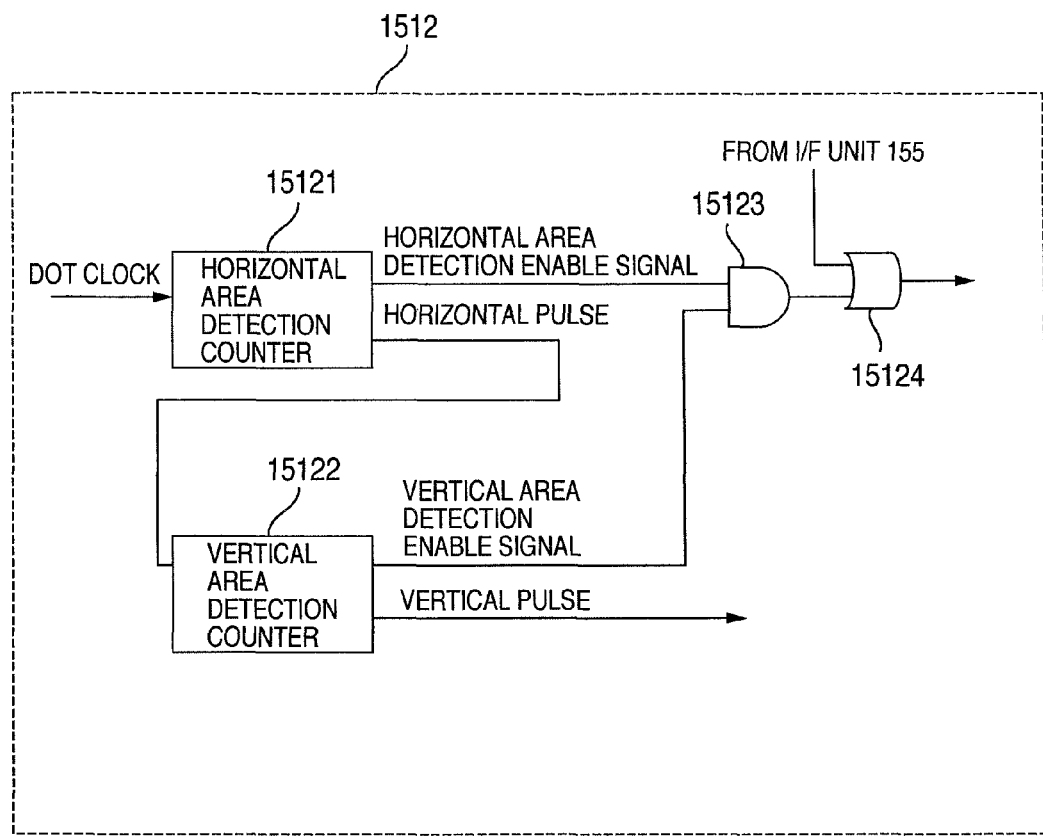
FIG. 38 is a block diagram showing a configuration example of a characteristic area controller.

FIG. 38 shows a configuration example of the characteristic point detection area controller 1512. A horizontal area detection counter 15121 counts dot clock pulses in an input video signal. When the count has reached a predetermined value, the horizontal area detection counter 15121 outputs a horizontal enable signal. When the count has coincided with the number of pixels in the horizontal direction of the display device 16, the horizontal area detection counter 15121 outputs a horizontal pulse and clears the count. A vertical area detection counter 15122 counts the horizontal pulses output from the horizontal area detection counter 15121. When the count has reached a predetermined value, the vertical area detection counter 15122 outputs a vertical enable signal. When the count has coincided with the number of pixels in the vertical direction of the display device 16, the vertical area detection counter 15122 outputs a vertical pulse and clears the count.

An AND gate 15123 outputs a logical product of the horizontal enable signal output from the horizontal area detection counter 15121 and the vertical enable signal output from the vertical area detection counter 15122. An OR gate 15124 outputs a logical sum of a detection mask signal input from the I/F unit 155 and the output of the AND gate 15123 to the characteristic point detector 154 as a characteristic point detection enable signal. The characteristic point detector 154 handles only the video signal obtained while the characteristic point detection enable signal is at the high level as the subject of histogram computation and average value calculation, and disregards the video signal obtained while the characteristic point detection enable signal is at the low level. As a result, it becomes possible to conduct the characteristic point detection only in the contents display area with the black no-picture area excluded.

An example of operation of the characteristic point detection area 1512 controller will now be described with reference to FIGS. 39 to 42E.

Figure 39:
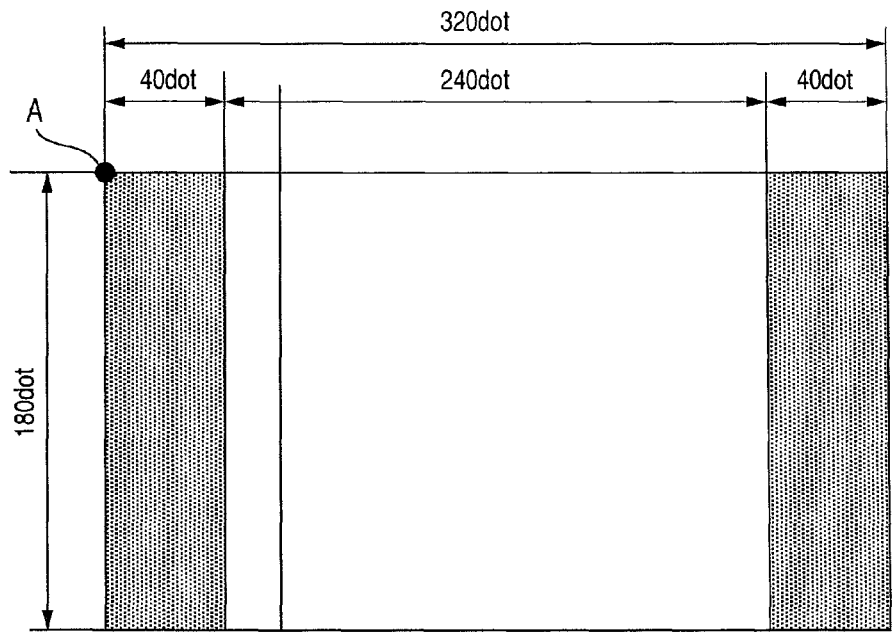
FIG. 39 shows an example of display positions of no-picture areas in an input video signal.

FIG. 39 shows positions and sizes of black no-picture areas on the display device 16. As for the number of pixels on the display device 16, it is supposed that, for example, there are 320 dots in the horizontal direction and 180 dots in the vertical direction in the same way as the above-described embodiments. It is also supposed that the aspect ratio is 16:9. In the present example, the black no-picture areas extend over 40 dots on the left and right of the display device 16.

Figure 40A:
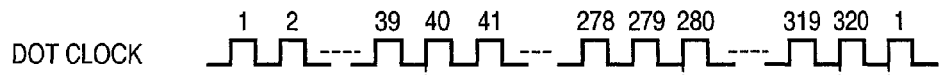
FIGS. 40A to 40C show an example of internal waveforms of a characteristic point detection area controller.
Figure 40B:
Figure 40C:
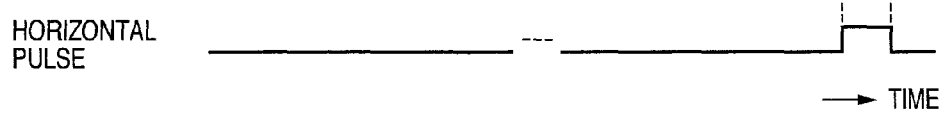

An example of operation in the horizontal area detection counter 15121 will now be described with reference to FIGS. 40A-40C. In the horizontal area detection counter 15121, 40 and 280 which are x coordinates of a start point and an end point of a horizontal detection area enable signal are preset, and 320 which is the number of pixels in the horizontal direction of the display device 16 is preset in order to generate the horizontal pulse. As for the presetting method, it may be set from the CPU 7, or the preset values may be fixed within the horizontal area detection counter 15121. The initial values are thus preset in the horizontal area detection counter 15121. As a result, the horizontal area detection counter 15121 counts dot clock pulses input thereto. When 40 clock pulses are counted, the horizontal detection area enable signal is changed to the high level. When 280 clock pulses are counted, the horizontal detection area enable signal is changed to the low level. In addition, when 320 clock pulses are counted, a high-level horizontal pulse is output. When the horizontal area detection counter 15121 has output the horizontal pulse, it resets the count, resumes counting from "0", and repeats the operation of periodically outputting the horizontal detection area enable signal and the horizontal pulse output at the above-described timing.

Figure 41A:
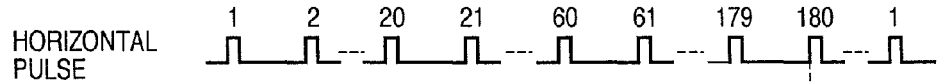
FIGS. 41A to 41C show an example of internal waveforms of a characteristic point detection area controller.
Figure 41B:
Figure 41C:
Figure 42A:
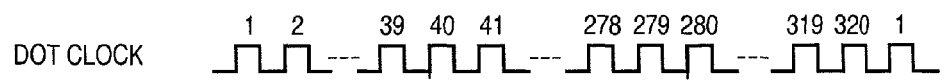
FIGS. 42A to 42E show an example of internal waveforms of a characteristic point detection area controller.
Figure 42B:
Figure 42C:
Figure 42D:
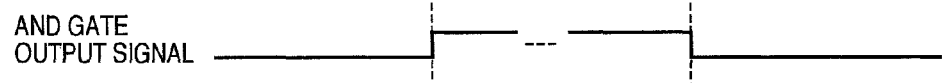
Figure 42E:

An example of operation in the vertical area detection counter 15122 will now be described with reference to FIGS. 41A-41C. In the vertical area detection counter 15122, 1 and 320 which are x coordinates of a start point and an end point of a vertical detection area enable signal are preset, and 320 which is the number of pixels in the horizontal direction of the display device 16 are preset in order to generate the vertical pulse. As for the presetting method, it may be set from the CPU 7, or the preset values may be fixed within the vertical area detection counter 15122. The initial values are thus preset in the vertical area detection counter 15122. As a result, the vertical area detection counter 15122 counts horizontal pulses input thereto. When one clock pulse is counted, the vertical detection area enable signal is changed to the high level. When 320 clock pulses are counted, i.e., at all times, the high level is output as the vertical detection area enable signal. In addition, when 180 clock pulses are counted, a high-level vertical pulse is output. Upon outputting the vertical pulse, the vertical area detection counter 15122 resets the count, resumes counting from "0", and repeats the operation of periodically outputting the vertical detection area enable signal and the vertical pulse output at the above-described timing. Here, the example of the case where a video signal having black no-picture areas inserted only on the left and right of the contents display area as shown in FIG. 39 is input will be described. However, this is not restrictive, but the black no-picture areas may be inserted above and below the contents display area. In that case, the CPU 7 should set the start position and the end position of the contents display area in the vertical direction.

Input and output waveforms of the AND gate 15123 are shown in FIGS. 42A-42E. Only when both the horizontal detection area enable signal and the vertical detection area enable signal are at the high level, the AND gate 15123 outputs the high level. Therefore, the high level is output over a period ranging from the 40th dot clock pulse to the 280th clock pulse in the horizontal direction and over a period ranging from the first dot clock pulse to the 180th dot clock pulse in the vertical direction, i.e., while the video signal corresponding to the contents display area is flowing.

An OR gate 15124 outputs a logical sum of the output of the AND gate 15123 and the area detection mask signal input from the I/F unit 155 to the characteristic point detector 154 as a sampling enable signal. By using this OR gate 15124, it is possible to control whether to convey the output of the AND gate 15123 supplied from the CPU 7 via the I/F unit 155 to the characteristic point detector 154 as it is or fix the output of the OR gate 15124 to the high level to mask the output of the AND gate 15123. As a result, the CPU 7 can control whether to conduct the characteristic point detection in the whole screen including the black no-picture area or conduct the characteristic point detection only in the contents display area which does not include the black no-picture area. Here, the example of the latter case will be described. If the area of the black no-picture area is small, however, there is not a serious problem even if the former case is used.

Figure 43:
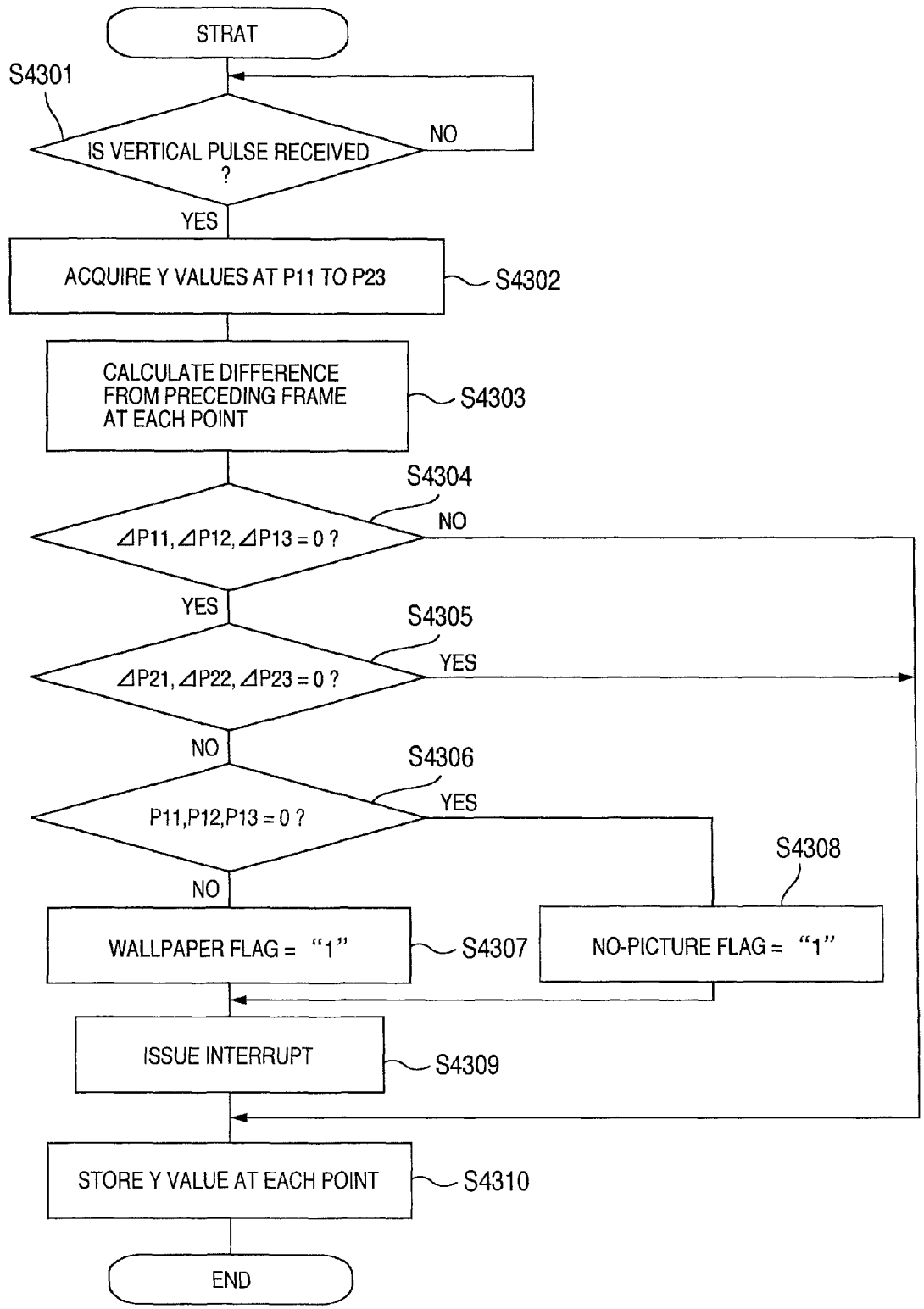
FIG. 43 is a flow diagram showing an example of processing conducted in an I/F circuit.

A flow of decision concerning the black no-picture area in the I/F unit 155 will now be described with reference to FIG. 43. A decision is made at S4301 whether a vertical pulse has been received. If received, the I/F unit 155 acquires the value of the luminance signal Y at each detection point from the pattern portion detector 1511 (S4302). At S4303, the I/F unit 155 finds a difference from the preceding frame at each detection point. With respect to the detection points P11, P12 and P13, which are included in the pattern portion when the 4:3 video image is displayed, a decision is made at S4304 whether the difference (ΔP11, ΔP12, Δ13) from the preceding frame is "0". When this difference is not "0", the I/F unit 155 judges that a pattern portion is not contained and proceeds to S4310.

On the other hand, if the difference is "0", the I/F unit 155 proceeds to S4305. With respect to the detection points P21, P22 and P23, which are included in the contents display region when the 4:3 video image is displayed, a decision is made at S4305 whether the difference (ΔP21, ΔP22, ΔP23) from the preceding frame is "0". When this difference is "0", the I/F unit 155 judges that the points are not in the pattern portion, and proceeds to S4310.

When the frame difference at P21, P22 and P23 is not "0", the I/F unit 155 judges that the points are included in a pattern portion, and makes a decision at S4306 whether the pattern portion is a black no-picture area portion. When the value of the luminance signal Y at P11, P12 and P13 is not "0", the I/F unit 155 judges the pattern portion to be a wallpaper portion and sets a flag provided in a part of the register to indicate whether a wallpaper portion is present to "1": "a wallpaper portion is present" (S4307). If the value of the luminance signal Y is "0", the I/F unit 155 judges the pattern portion to be a black no-picture area, and sets a flag provided to indicate whether a no-picture area is present to "1": "a no-picture area is present" (S4308).

At S4309, the I/F unit 155 issues an interrupt to the CPU 7, requests register reading, and notifies the CPU 7 that the contents have a wallpaper portion or a no-picture area. At S4310, the value of the luminance signal Y at each detection point is stored as preceding frame data.

Figure 44:
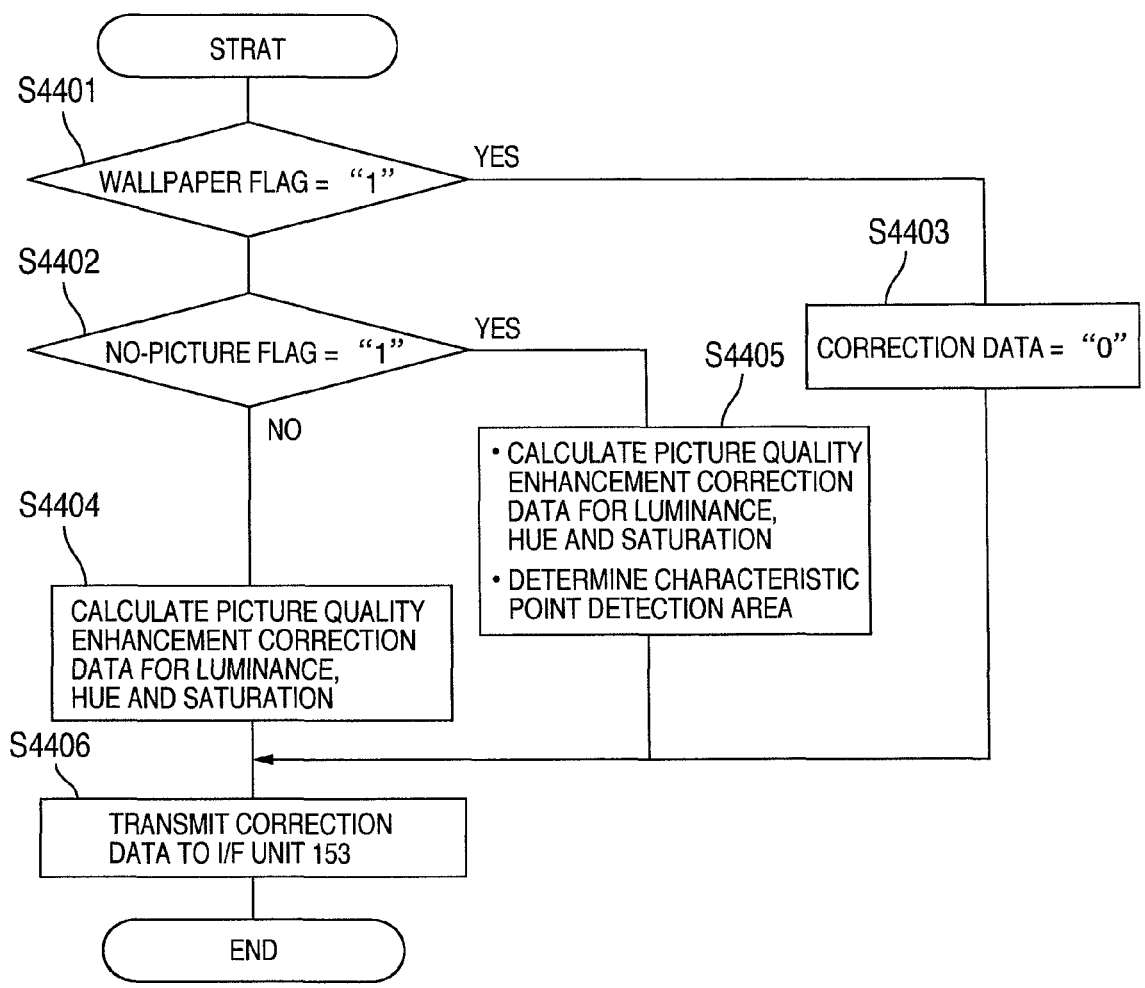
FIG. 44 is a flow diagram showing an example of processing conducted in a CPU.

FIG. 44 shows a processing flow in the CPU 7. Correction characteristics update processing in the CPU 7 is executed by receiving the interrupt 141 from the I/F unit 155. When the wallpaper flag is "1" at S4401, i.e., if a black no-picture area portion is contained in the pattern portion, then the CPU 7 sets correction data="0" at S4403 and proceeds to S4406. On the other hand, if the wallpaper flag is "0", the CPU 7 proceeds to S4402.

When the no-picture flag is "1" at S4402, i.e., if a no-picture area having a single black color is contained, the CPU 7 fixes the output for the input gradation that is a definite value or less to "0", calculates correction data to conduct picture quality enhancement processing suitable for contents having a non-picture area, and determines a characteristic point detection area (S4405). By the way, the picture quality enhancement processing suitable for contents having a non-picture area will be described later.

If the no-picture flag is "0" at S4402, then the CPU 7 calculates the correction data to conduct ordinary picture quality enhancement processing (S4404). At S4406, the CPU 7 transfers the correction data to the I/F unit 153.

Hereafter, an operation example in the case where contents having black no-picture area portions shown in FIGS. 45A-45C are input will be described. FIG. 45A shows a video image of a preceding frame. As shown in FIG. 45A, no-picture area portions are inserted on the left and right of 4:3 contents. If such a video signal is input, P11:0, P12:0, P13:0, P21:100, P22:50 and P23:40 are retained as the values of the luminance signal Y in the preceding frame as indicated in a column of frame 1 in FIG. 45C. In the flow diagram shown in FIG. 43, the vertical pulse is detected at S4301. Thereafter, the I/F unit 155 acquires P11:0, P12:0, P13:0, P21:80, P22:80 and P23:50 as the value of the luminance signal Y at each detection point shown in FIG. 45B as indicated in a column of frame 2 in FIG. 45C, and the I/F unit 155 proceeds to S4303. At S4303, the difference between the frame 1 and the frame 2 is calculated. Therefore, the difference between the frame 1 and the frame 2 becomes ΔP11:0, ΔP12:0, ΔP13:0, ΔP21:−10, ΔP22:30 and ΔP23:10 as indicated in a column of the frame difference in FIG. 45C. Since ΔP11, ΔP12 and ΔP13 are "0" at S4304, the I/F unit 155 proceeds to S4305, where a decision is made whether ΔP21, ΔP22 and ΔP23 are "0". Since ΔP21, ΔP22 and ΔP23 are not "0", the I/F unit 155 proceeds to S4306.

Since P11, P12 and P13 are "0" at S4306, the I/F unit 155 proceeds to S4308. At S4308, the I/F unit 155 sets no-picture flag="1" in the register and proceeds to S4309. At S4309, the I/F unit 155 issues an interrupt to the CPU 7, requests register reading, notifies the CPU 7 that the contents have no-picture area portions, and proceeds to S4310. At S4310, the I/F unit 155 stores the values of the luminance signal Y at respective detection points, and finishes the processing.

Figure 46:
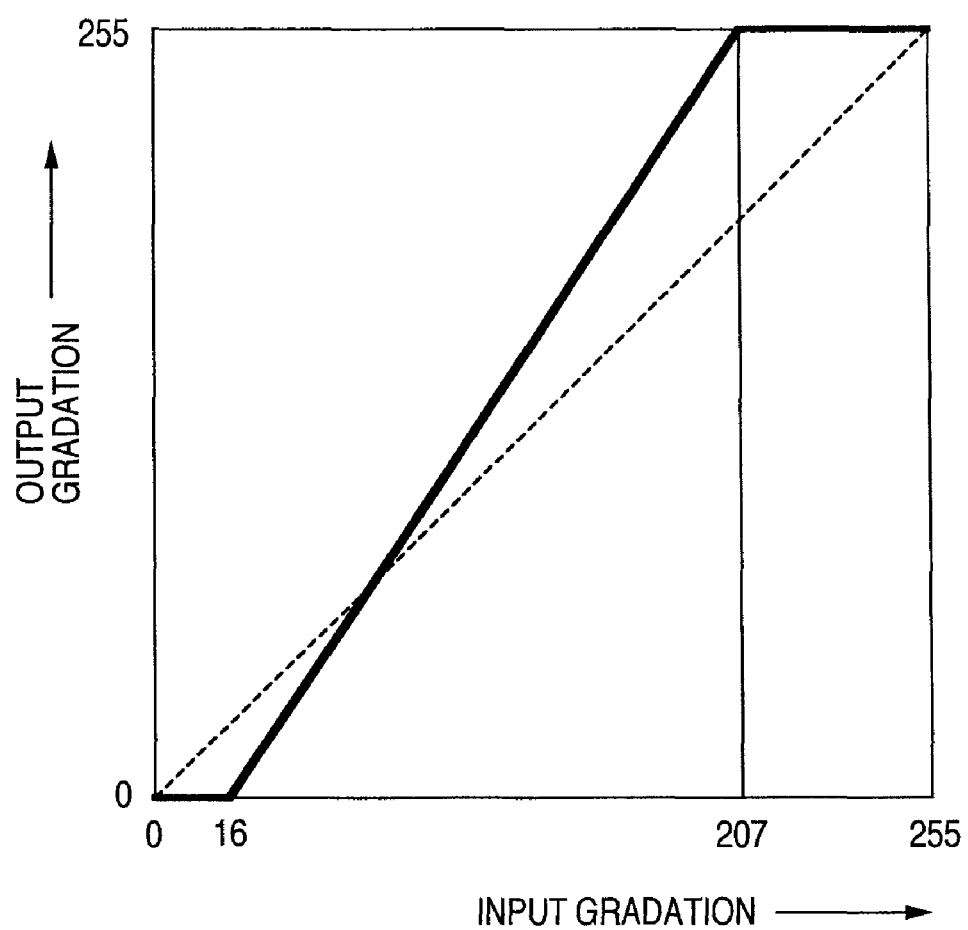
FIG. 46 shows an example of correction characteristics.

Even if the contents have the input gradation in the range of 0 to 15, correction is conducted at S4405 so as to fix the output for the input signal in the range of 0 to 15 to 0 as shown in FIG. 46, as the correction characteristics suitable for the contents having no-picture area portions. As a result of such correction, a part of the gradation on the black side is lost. However, there is a merit that the noise contained in the no-picture area portions is removed and the patterns portions can be displayed as uniform black. It is possible to make the image look more attractive.

In order to remove the influence of the black no-picture area portion upon the characteristic point calculation of the image, the CPU 7 specifies coordinates of the contents display area, sets a desired count in each of the horizontal position counter 15111 and the vertical position counter 15112, and presets a value output to the I/F unit 153 so as to output the low level to the OR gate 15124. By setting the preset value into the I/F unit 153 at S4406, it is possible to conduct picture quality correction optimum for the contents having no-picture area portions.

In the present embodiment, the case where the video signal is corrected when contents having black no-picture area portions are input has been described. However, this is not restrictive, but correction may be conducted when white no-picture area portions are contained. In this case, a decision is made at S4306 in FIG. 43 whether P11 and so on are 255. Even if noise is contained, flicker in the pattern portion can be prevented by exercising control so as to fix the gradation on the white side assuming at least a definite value to "255".

In FIG. 37, the characteristic point detection area controller 1512 is provided only on the characteristic point detector 154 side. However, it is also possible to control the modulation area as well by providing the characteristic point detection area controller 1512 on the modulator 152 side as well. As a result, for example, it is possible to exclude the pattern portions and conduct correction only in the contents display area. Even in a pattern portion that is not a black or white no-picture area but that has, for example, a pattern, the output may be made "0" to display a single black color if every gradation level distributes in a range below a certain definite level. On the contrary, if every gradation level distributes in a range above a certain definite level, the output may be made "255" to display a single white color.

In the foregoing embodiments, the case where pattern portions are added on the left and right of the image has been described as an example. However, this is not restrictive, but the embodiments may be applied to the case where pattern portions are contained above and below the image. Detection of the pattern portions located above and below the image can be coped with a similar processing method by disposing the detection points above and below the image.

In addition, time is displayed on the screen or a caption or a mark is inserted on the periphery of the screen, in some cases. In order to cope with such a case, it is also possible to previously exclude definite portions located above and below the image and located on the left and right of the image from the characteristic point detection area and conduct the characteristic point detection only in the central part of the screen, regardless of the result of the decision in the pattern portion detector 1511. As a result, it is possible to suppress changes in characteristic data caused by insertion of the caption or the like and prevent flicker and color changes on the screen.

The foregoing invention has been described in terms of preferred embodiments. However, those skilled, in the art will recognize that many variations of such embodiments exist. Such variations are intended to be within the scope of the present invention and the appended claims.

The invention claimed is:

1. A video processing apparatus comprising:
   an input unit to which a video signal containing content is input;
   a first detector which detects a color of light in the surroundings;
   a second detector which detects whether a pattern portion formed of a single color of black or white is contained in the video signal input to the input unit;
   a corrector which corrects the video signal input to the input unit;
   a controller which conducts control so that the corrector corrects the video signal input to the input unit according to the color of light detected by the first detector if the second detector detects that the pattern portion formed of the single color of black or white is contained in the video signal input to the input unit; and a third detector which detects whether a pattern portion formed of a chromatic color is contained in the video signal input to the input unit;

wherein the controller conducts control so that the corrector stops update of data for correcting the video signal input to the input unit if the third detector detects that the pattern portion formed of the chromatic color is contained in the video signal input to the input unit.

2. A video processing apparatus comprising:

an input unit to which a video signal containing content is input;

a first detector which detects a plurality of colors of light in the surroundings;

a calculator which calculates a ratio among colors of light detected by the first detector;

a second detector which detects whether a pattern portion formed of a single color of black or white is contained in the video signal input to the input unit;

a corrector which corrects the video signal input to the input unit; and a controller which conducts control so that the corrector corrects the video signal input to the input unit according to the ratio calculated by the calculator if the second detector detects that the pattern portion formed of the single color of black or white is contained in the video signal input to the input unit.

3. A video processing apparatus according to claim 2, further comprising:

a third detector which detects whether a pattern portion formed of a chromatic color is contained in the video signal input to the input unit, wherein the controller conducts control so that the corrector stops correcting the video signal input to the input unit if the third detector detects that the pattern portion formed of the chromatic color is contained in the video signal input to the input unit.

4. A video processing apparatus according to claim 2, further comprising:

a third detector which detects whether a pattern portion formed of a chromatic color is contained in the video signal input to the input unit, wherein the controller conducts control so that the corrector stops update of data for correcting the video signal input to the input unit if the third detector detects that the pattern portion formed of the chromatic color is contained in the video signal input to the input unit.

5. A video processing apparatus according to claim 2, wherein the controller conducts control so that the corrector corrects only a content portion of the video signal input to the input unit if the second detector detects that the pattern portion formed of the single color of black or white is contained in the video signal input to the input unit.

6. A video processing apparatus according to claim 2, wherein the controller conducts control so that the corrector corrects the video signal input to the input unit in such a way as to lower a gain for the color which is large in quantity among the colors of light detected by the first detector as a result of the calculation conducted by the calculator.

7. A video processing apparatus comprising:

an input unit to which a video signal containing content is input;

a first detector which detects a color of light in the surroundings;

a second detector which detects whether a pattern portion formed of a single color of black or white is contained in the video signal input to the input unit;

a display which displays a video image based on the video signal input to the input unit;

a corrector which corrects a quality of the video image to be displayed by the display;

a controller which conducts control so that the corrector corrects the quality of the video image to be displayed by the display according to the color of light detected by the first detector if the second detector detects that the pattern portion formed of the single color of black or white is contained in the video signal input to the input unit; and a third detector which detects whether a pattern portion formed of a chromatic color is contained in the video signal input to the input unit;

wherein the controller conducts control so that the corrector stops update of data for correcting the video image to be displayed by the display if the third detector detects that the pattern portion formed of the chromatic color is contained in the video signal input to the input unit.

* * * * *